(12) United States Patent
Strickland et al.

(10) Patent No.: US 12,734,858 B2
(45) Date of Patent: Sep. 15, 2026

(54) ELECTRONICALLY CONTROLLED SWAY BAR DAMPING LINK

(71) Applicant: Fox Factory, Inc., Duluth, GA (US)

(72) Inventors: Rick Strickland, Winder, GA (US); Phillip A. Kendrick, Statham, GA (US); Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 119 days.

(21) Appl. No.: 18/789,372

(22) Filed: Jul. 30, 2024

(65) Prior Publication Data

US 2025/0083489 A1 Mar. 13, 2025

Related U.S. Application Data

(63) Continuation of application No. 18/084,442, filed on Dec. 19, 2022, now Pat. No. 12,083,850.

(60) Provisional application No. 63/291,868, filed on Dec. 20, 2021.

(51) Int. Cl.
*B60G 21/055* (2006.01)
*F16F 9/20* (2006.01)

(52) U.S. Cl.
CPC ............ *B60G 21/0558* (2013.01); *F16F 9/20* (2013.01); *B60G 2202/24* (2013.01); *B60G 2202/413* (2013.01); *B60G 2204/1224* (2013.01)

(58) Field of Classification Search
CPC ........ B60G 21/0558; B60G 2204/1224; B60G 21/0553; B60G 2202/24
See application file for complete search history.

(56) References Cited

U.S. PATENT DOCUMENTS

| | | | |
|---|---|---|---|
| 2,836,431 | A | 5/1958 | Antoine |
| 2,941,815 | A | 6/1960 | Josef |
| 3,357,512 | A | 12/1967 | Wilson |
| 3,602,470 | A | 8/1971 | Reynolds |

(Continued)

FOREIGN PATENT DOCUMENTS

| | | | |
|---|---|---|---|
| CN | 116568533 | A | 8/2023 |
| DE | 2849015 | A1 | 5/1980 |

(Continued)

OTHER PUBLICATIONS

European Search Report for EP Application No. 21215569.1, 9 pages, Mailed May 10, 2022.

(Continued)

*Primary Examiner* — John Olszewski
*Assistant Examiner* — Matthew D Lee

(57) ABSTRACT

Disclosed herein is a sway bar system comprising a damping link that couples a first end of a sway bar to a first location on a vehicle. The damping link is comprised of a body comprising a damping chamber and a reservoir. There is also a through shaft coupled to a piston, where the piston divides the chamber into a first chamber and a second chamber. A high-pressure line is fluidly coupled with the chamber and the reservoir and allows fluid to flow from the first chamber and the second chamber to the reservoir. A low-pressure line is fluidly coupled with the chamber and the reservoir and allows fluid to flow from the reservoir to the first chamber and the second chamber. The high-pressure line and the low-pressure line assist in self-centering the sway bar.

28 Claims, 12 Drawing Sheets

(56) References Cited

U.S. PATENT DOCUMENTS 3,871,635 A 3/1975 Unruh et al.
3,986,118 A 10/1976 Madigan
4,159,756 A 7/1979 Murakami et al.
4,183,509 A 1/1980 Nishikawa et al.
4,589,528 A 5/1986 Axthammer et al.
4,773,671 A 9/1988 Inagaki
4,921,080 A 5/1990 Lin
4,958,704 A 9/1990 Leiber et al.
4,984,819 A 1/1991 Kakizaki et al.
5,027,303 A 6/1991 Witte
5,035,306 A 7/1991 Ashiba
5,105,918 A 4/1992 Hagiwara et al.
5,149,131 A 9/1992 Sugasawa et al.
5,171,036 A 12/1992 Ross
5,172,794 A 12/1992 Ward
5,186,486 A 2/1993 Hynds et al.
5,236,520 A 8/1993 Gallagher
5,265,703 A 11/1993 Ackermann
5,295,705 A 3/1994 Butsuen et al.
5,362,094 A 11/1994 Jensen
5,390,949 A 2/1995 Naganathan et al.
5,522,280 A 6/1996 Bexten
5,597,180 A 1/1997 Ganzel et al.
5,624,105 A 4/1997 Runkel
5,630,623 A 5/1997 Ganzel
5,899,472 A 5/1999 Burke et al.
5,921,360 A 7/1999 Moradmand
5,952,823 A 9/1999 Sprecher et al.
5,987,366 A 11/1999 Jun
6,073,536 A 6/2000 Campbell
6,135,434 A 10/2000 Marking
6,244,398 B1 6/2001 Girvin et al.
6,250,658 B1 6/2001 Sakai
6,276,693 B1 8/2001 Oakley et al.
6,427,812 B2 8/2002 Crawley et al.
6,457,730 B1 10/2002 Urbach
6,520,510 B1 2/2003 Germain et al.
6,669,208 B1 12/2003 Monk et al.
6,863,291 B2 3/2005 Miyoshi
6,935,157 B2 8/2005 Miller
7,234,714 B2 6/2007 Germain et al.
7,374,028 B2 5/2008 Fox
7,384,053 B1 6/2008 Boecker et al.
7,472,914 B2 1/2009 Anderson et al.
7,484,603 B2 2/2009 Fox
7,997,588 B2 8/2011 Ohnuma et al.
8,220,807 B2 7/2012 Lorenzon et al.
8,534,687 B2 9/2013 Coombs et al.
8,550,223 B2 10/2013 Cox et al.
8,627,932 B2 1/2014 Marking
8,807,542 B2 8/2014 Wootten et al.
8,838,335 B2 9/2014 Bass et al.
8,857,580 B2 10/2014 Marking
8,899,560 B2 12/2014 Allen et al.
8,955,653 B2 2/2015 Marking
9,033,122 B2 5/2015 Ericksen et al.
9,058,038 B2 6/2015 Zhang et al.
9,120,362 B2 9/2015 Marking
9,239,090 B2 1/2016 Marking et al.
9,303,712 B2 4/2016 Cox
9,340,088 B2 5/2016 Otake et al.
9,353,818 B2 5/2016 Marking
9,452,654 B2 9/2016 Ericksen et al.
9,471,697 B2 10/2016 Lortz et al.
9,491,788 B1 11/2016 Kasai et al.
9,623,716 B2 4/2017 Cox
9,682,604 B2 6/2017 Cox et al.
9,797,467 B2 10/2017 Wootten et al.
9,879,749 B2 1/2018 McNab
10,036,443 B2 7/2018 Galasso et al.
10,040,329 B2 8/2018 Ericksen et al.
10,047,817 B2 8/2018 Ericksen et al.
10,060,499 B2 8/2018 Ericksen et al.
10,086,673 B2 10/2018 Baales et al.
10,415,662 B2 9/2019 Marking
10,443,671 B2 10/2019 Marking
10,737,546 B2 8/2020 Tong
10,825,266 B2 11/2020 Srinivasan et al.
10,933,710 B2 3/2021 Tong
10,981,429 B2 4/2021 Tsiaras et al.
11,009,096 B2 5/2021 Lamoureux et al.
11,097,590 B2 8/2021 Simula et al.
11,173,767 B2 11/2021 Cox
11,192,424 B2 12/2021 Tabata et al.
11,584,182 B1 2/2023 Smith
11,634,003 B2 4/2023 Negishi et al.
11,878,678 B2 1/2024 Krosschell et al.
11,904,648 B2 2/2024 Graus et al.
11,926,189 B2 3/2024 Tsiaras et al.
11,993,121 B1 5/2024 Schubart et al.
12,083,850 B2 9/2024 Strickland et al.
12,083,851 B1 9/2024 Dhaens et al.
12,251,978 B2 3/2025 Dhaens et al.
12,404,847 B2 9/2025 Schubart et al.
12,496,867 B2 12/2025 Randall et al.
12,522,042 B1 1/2026 Brennan et al.
12,545,072 B2 2/2026 Cox
2002/0125675 A1 9/2002 Clements et al.
2004/0113377 A1 6/2004 Klees
2004/0173985 A1 9/2004 Bruhl et al.
2004/0222056 A1 11/2004 Fox
2004/0231904 A1 11/2004 Beck et al.
2005/0077696 A1 4/2005 Ogawa
2005/0082127 A1 4/2005 Barber et al.
2006/0065496 A1 3/2006 Fox
2006/0287791 A1 12/2006 Boon et al.
2007/0051573 A1 3/2007 Norgaard et al.
2007/0235955 A1 10/2007 Mizukoshi et al.
2008/0129000 A1 6/2008 Munday et al.
2008/0203694 A1 8/2008 Gartner et al.
2009/0140501 A1 6/2009 Taylor et al.
2009/0267311 A1 10/2009 Ohnuma et al.
2010/0225084 A1 9/2010 Chapman et al.
2012/0018263 A1 1/2012 Marking
2012/0205843 A1 8/2012 Allen et al.
2012/0222927 A1 9/2012 Marking
2013/0197755 A1 8/2013 Otake et al.
2013/0228404 A1 9/2013 Marking
2013/0292218 A1 11/2013 Ericksen et al.
2014/0008160 A1 1/2014 Marking et al.
2014/0224606 A1 8/2014 Baales et al.
2014/0239602 A1 8/2014 Blankenship et al.
2015/0083535 A1 3/2015 Ericksen et al.
2015/0224845 A1 8/2015 Avadhany et al.
2015/0290991 A1 10/2015 Cox
2016/0265615 A1 9/2016 Marking
2017/0120713 A1 5/2017 Drozdowski et al.
2017/0129302 A1 5/2017 Jackson
2017/0136842 A1 5/2017 Anderson et al.
2017/0282669 A1 10/2017 Cox et al.
2018/0345747 A1 12/2018 Boon et al.
2019/0001775 A1 1/2019 Anderson et al.
2019/0100071 A1* 4/2019 Tsiaras ............... B60G 17/0162
2019/0241039 A1 8/2019 Simula et al.
2019/0360505 A1 11/2019 Belter et al.
2020/0180385 A1 6/2020 Marking
2021/0061052 A1 3/2021 Kim
2021/0086581 A1 3/2021 Smith
2021/0114431 A1 4/2021 Cox
2021/0197640 A1 7/2021 Yamashita
2021/0229519 A1 7/2021 Tsiaras et al.
2021/0309063 A1 10/2021 Negishi et al.
2021/0309064 A1 10/2021 Negishi et al.
2021/0316716 A1 10/2021 Krosschell et al.
2022/0016949 A1 1/2022 Graus et al.
2022/0105777 A1 4/2022 Cox
2022/0134835 A1 5/2022 Izak et al.
2022/0144035 A1 5/2022 Al Sakka et al.
2022/0176769 A1 6/2022 Tong
2022/0194161 A1 6/2022 Negishi et al.
2022/0242186 A1 8/2022 Tong
2022/0242190 A1 8/2022 Stanford et al.
2022/0355638 A1 11/2022 Worley
2022/0388362 A1 12/2022 Graus et al.

(56) References Cited

U.S. PATENT DOCUMENTS

| | | | |
|---|---|---|---|
| 2023/0111759 | A1 | 4/2023 | Vandersmissen et al. |
| 2023/0113777 | A1 | 4/2023 | Vandersmissen et al. |
| 2023/0113819 | A1 | 4/2023 | Vandersmissen et al. |
| 2023/0114717 | A1 | 4/2023 | Boon et al. |
| 2023/0115594 | A1 | 4/2023 | Calchand et al. |
| 2023/0202252 | A1 | 6/2023 | Smith |
| 2023/0249702 | A1 | 8/2023 | Peterson et al. |
| 2023/0256785 | A1 | 8/2023 | Worley |
| 2023/0271473 | A1 | 8/2023 | Strickland et al. |
| 2023/0294603 | A1 | 9/2023 | Dwyer et al. |
| 2023/0302865 | A1 | 9/2023 | Tong et al. |
| 2023/0302866 | A1 | 9/2023 | Tong et al. |
| 2023/0302867 | A1 | 9/2023 | Tong et al. |
| 2024/0100904 | A1 | 3/2024 | Negishi et al. |
| 2024/0131892 | A1 | 4/2024 | Graus et al. |
| 2024/0198753 | A1 | 6/2024 | Peterson et al. |
| 2024/0286452 | A1 | 8/2024 | Jensen et al. |
| 2024/0375474 | A1 | 11/2024 | Tsiaras et al. |
| 2025/0083489 | A1 | 3/2025 | Strickland et al. |

FOREIGN PATENT DOCUMENTS

| | | | | | |
|---|---|---|---|---|---|
| DE | 102005045177 | A1 | | 3/2007 | |
| DE | 112005003567 | T5 | | 3/2008 | |
| DE | 102012006928 | A1 | | 11/2012 | |
| DE | 202013100681 | U1 | | 4/2013 | |
| DE | 202013007733 | U1 | | 10/2013 | |
| DE | 102021104176 | A1 | | 8/2021 | |
| EP | 0648625 | A1 | | 4/1995 | |
| EP | 0829383 | A2 | | 3/1998 | |
| EP | 1000782 | A2 | * | 5/2000 | ............ B60G 17/04 |
| EP | 1022169 | A2 | | 7/2000 | |
| EP | 1238833 | A1 | | 9/2002 | |
| EP | 2123933 | A2 | | 11/2009 | |
| EP | 1961649 | B1 | | 12/2010 | |
| EP | 3461663 | A1 | | 4/2019 | |
| EP | 4112339 | A1 | | 1/2023 | |
| EP | 4197830 | A1 | | 6/2023 | |
| EP | 4253106 | A1 | | 10/2023 | |
| EP | 4269137 | A1 | | 11/2023 | |
| EP | 4269137 | B1 | | 10/2025 | |
| EP | 4197830 | B1 | | 11/2025 | |
| FR | 2927020 | A1 | * | 8/2009 | ......... B60G 21/0558 |
| FR | 3040331 | A1 | | 3/2017 | |
| FR | 3101809 | A1 | | 4/2021 | |
| FR | 3152739 | A1 | * | 3/2025 | ......... B60G 17/0162 |
| GB | 2006131 | A | | 5/1979 | |
| GB | 2343663 | A | | 5/2000 | |
| GB | 2351951 | A | | 1/2001 | |
| GB | 2377415 | A | | 1/2003 | |
| GB | 2377415 | B | | 9/2003 | |
| JP | S61146612 | A | | 7/1986 | |
| JP | H0419210 | A | | 1/1992 | |
| JP | H04191115 | A | | 7/1992 | |
| JP | H11165521 | A | | 6/1999 | |
| JP | 2001105827 | A | | 4/2001 | |
| JP | 2002264625 | A | | 9/2002 | |
| JP | 2015058711 | A | * | 3/2015 | |
| JP | 2016211676 | A | | 12/2016 | |
| WO | WO-0166969 | A1 | * | 9/2001 | .............. F16F 9/532 |
| WO | 03008215 | A1 | | 1/2003 | |
| WO | 2016060066 | A1 | | 4/2016 | |
| WO | 2018215176 | A1 | | 11/2018 | |
| WO | WO-2018229376 | A1 | * | 12/2018 | ......... B60G 21/0555 |
| WO | 2020214666 | A1 | | 10/2020 | |
| WO | 2022016155 | A1 | | 1/2022 | |

OTHER PUBLICATIONS

European Search Report for European Application No. 22215230.8, 9 Pages, Apr. 4, 2023.

European Search Report for European Application No. 23170219.2, 9 Pages, Aug. 22, 2023.

Extended European Search Report for EP Application 22177563.8, dated Nov. 11, 2022, 14 pages.

Extended European Search Report for EP Application 18197941.0 dated Feb. 27, 2019, 11 pages.

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

European Examination Report for EP Application No. 21215569.1, 5 pages, Mailed Jan. 8, 2025.

European Examination Report for EP Application No. 21215569.1, 9 pages, Mailed May 16, 2024.

European Extended Search Report for European Application No. 20879677.1, 8 Pages, Mailed Oct. 23, 2023.

European Search Report for European Application No. 23158363.4, 8 pages, Sep. 6, 2023.

PCT International Search Report for PCT/US2020/056869, 11 Pages, Mailed Jan. 12, 2021.

* cited by examiner

ELECTRONICALLY CONTROLLED SWAY BAR DAMPING LINK

CROSS-REFERENCE TO RELATED APPLICATIONS

This application is a Continuation application and claims benefit of co-pending U.S. patent application Ser. No. 18/084,442 filed Dec. 19, 2022, entitled "ELECTRONICALLY CONTROLLED SWAY BAR DAMPING LINK" by Strickland et al., assigned to the assignee of the present application, which is herein incorporated by reference in its entirety.

The application Ser. No. 18/084,442 claims benefit of U.S. Provisional Patent Application Ser. No. 63/291,868 filed Dec. 20, 2021, entitled "ELECTRONICALLY CONTROLLED SWAY BAR DAMPING LINK" by Strickland et al., assigned to the assignee of the present application, which is herein incorporated by reference in its entirety.

FIELD OF THE INVENTION

Embodiments of the invention generally relate to sway bar assemblies.

BACKGROUND

A sway bar (anti-sway bar, roll bar, anti-roll bar, stabilizer bar) is a part of an automobile suspension that reduces the body roll of a vehicle. The sway bar is basically a torsion spring that resists body roll motions. Often, it is formed from a cylindrical steel bar patterned in a "U" shape. A conventional sway bar assembly includes a sway bar and also includes two end links. Typically, the first of the two end links is flexibly coupled to one end of the sway bar, and the second of the two end links is flexibly coupled to the other end of the sway bar. Each of the two end links are then connected to a location on the vehicle near a wheel or axle (such as coupled to a control arm or other suspension feature) at respective left and right sides of the suspension for the vehicle. As a result, when the left and right sides of the suspension move together, the sway bar rotates about its mounting points. However, when the left and right sides of the suspension move relative to one another, the sway bar is subjected to torsion and forced to twist. The twisting of the sway bar transfers the forces between a heavily-loaded suspension side (the side of the vehicle subjected to more roll movement force than the other side of the vehicle) to the opposite, lesser-loaded, suspension side (the side of the vehicle subjected to lesser roll movement force than the other side of the vehicle).

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1A:
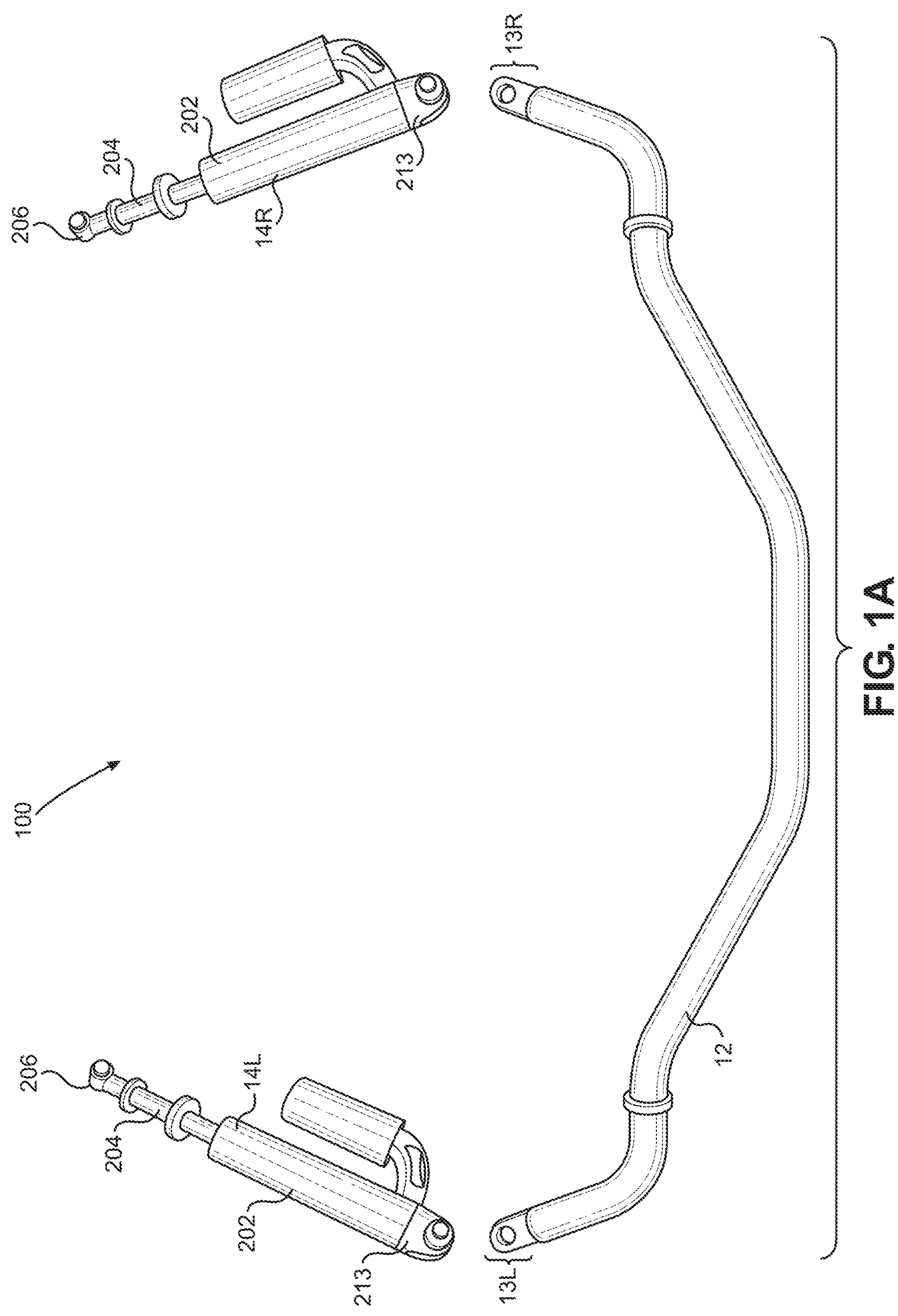
FIG. 1A is a perspective view of a sway bar system including a sway bar and two electronically controlled damper links, in accordance with one embodiment.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In the following discussion, embodiments of the sway bar system (also referred to herein as an "E-Sway Bar" system) are described in detail. As will be described below, embodiments of the sway bar system advantageously enable remote input (e.g., manual remote input or automatic remote input) to manipulate the stiffness of the sway bar system. The stiffness of the sway bar system can be thought of as, for example, a driver's (or passenger's) perception of the "roll stability" of the vehicle. In other words, the perception of the driver (or passenger) of the vehicle for the vehicle to resist or allow "roll motion". As one example, when riding in a vehicle (e.g., a sports car) which appears to provide significant resistance to a rolling motion of the vehicle, it can be said that the vehicle has a "stiff" sway bar system. As another example, when riding in a vehicle (e.g., a motorhome or bus) which appears to not provide significant resistance to a rolling motion of the vehicle, it can be said that the vehicle has a "soft" sway bar system.

It will be understood that a "soft" sway bar system is desired in various conditions. For example, a soft sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection of the sway bar from the suspension will provide additional performance enhancements and capabilities during slow maneuvering such as rock crawling, 4-wheeling, and other slower driving/obstacle clearing activities where maximum suspension articulation is desired, needed, and/or warranted. Further, it will be understood that "stiff" sway bar system is desired in various conditions such as normal speed driving, faster speed driving, or driving in a location or conditions that are not rock crawling and other slower driving/obstacle clearing activities, e.g., in locations where maximum articulation is not more important than ensuring the vehicle does not tip over due to body roll, or the like.

In contrast, in one embodiment a "soft" or range of softer settings of a connected sway bar system provides increased handling and body roll control during normal speed cornering and various driving activities. For example, it will be understood that a stiff sway bar system provides increased handling and control during high-speed cornering and various racing activities.

In one embodiment, a "hard" or range of settings from medium to all the way locked out settings of a connected sway bar system will provide increased handling and body roll control during high-speed cornering and various racing activities.

Further, in the following discussion, the term "active", as used when referring to a valve or damping component, means adjustable, manipulatable, etc., during typical operation of the valve. For example, a remotely controllable active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, a remotely controllable active valve may also be configured to automatically adjust its operation, and corresponding damping characteristics, based upon, for example, operational information pertaining to the vehicle and/or the suspension with which the valve is used. Similarly, it will be understood that in some embodiments, a remotely controllable active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g., raise or lower) a wheel with respect to the vehicle. In a "semi-active suspension", no motive force/actuator is employed to adjust move (e.g., raise or lower) a wheel with respect to the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g., raise or lower) a wheel with respect to the vehicle. As such, it will be understood that an "remotely controllable active valve", as defined above, is well suited for use in a "pure active suspension" or a "semi-active suspension".

In one embodiment, the damping characteristic of at least one damper is obtained by controlling a remotely adjustable remotely controllable active valve (may also be referred to as a remotely adjustable electronic valve or, more concisely, as just an remotely controllable active valve) of the damper, wherein the remotely adjustable remotely controllable active valve utilizes a relatively small solenoid (using relatively low amounts of power) to generate relatively large damping forces. Examples of such a remotely controllable active and semi-active valves and their features are described and shown in U.S. Pat. Nos. 8,627,932; 8,857,580; 9,033,122; 9,120,362; and 9,239,090 the content of which are incorporated by reference herein, in their entirety.

Referring now to FIG. 1A, a perspective view of a sway bar system 100 including a sway bar 12 and two electronically controlled damper links, 14L and 14R, is shown in accordance with one embodiment. For purposes of clarity, in FIG. 1A, electronically controlled damper link 14L and electronically controlled damper link 14R are shown slightly separated from sway bar 12 in order to more clearly depict the location of connection 13L, where electronically controlled damper link 14L couples to sway bar 12, and to more clearly depict the location, 13R, where electronically controlled damper link 14R couples to sway bar 12. In various embodiments of sway bar system 100, an upper portion of electronically controlled damper link 14L includes a bushing, or similar coupling feature, to readily enable coupling of electronically controlled damper link 14L to, for example, at connection 13L of sway bar 12. Similarly, in various embodiments of sway bar system 100, an upper portion of electronically controlled damper link 14R includes a bushing, or similar coupling feature, to readily enable coupling of electronically controlled damper link 14R to, for example, 13R of sway bar 12. It should be noted that sway bar system 100 is not limited solely to the use of a bushing for coupling one or both of electronically controlled damper link 14L and electronically controlled damper link 14R to sway bar 12.

With reference still to FIG. 1A, in various embodiments of sway bar system 100, a lower portion of electronically controlled damper link 14L includes an eyelet, or similar coupling feature, to readily enable coupling of electronically controlled damper link 14L to a location on a vehicle. Similarly, in various embodiments of sway bar system 100, a lower portion of electronically controlled damper link 14R includes an eyelet, or similar coupling feature, to readily enable coupling of electronically controlled damper link 14R to a location on a vehicle. It should be noted that sway bar system 100 is not limited solely to the use of an eyelet for coupling one or both of electronically controlled damper link 14L and electronically controlled damper link 14R to a vehicle.

Although the embodiment of FIG. 1A, depicts sway bar system 100 having two electronically controlled damper links 14L and 14R, in another embodiment, sway bar system 100 includes only a single electronically controlled damper link (e.g., only 14L or only 14R). In such an embodiment, an electronically controlled damper link (e.g., 14L or 14R) is coupled to one end (e.g., a first end) of sway bar 12, and, for example, a conventional end link is coupled to the other end (e.g., a second end) of sway bar 12. Hence, sway bar system 100 is well suited to embodiments in which one end of sway bar 12 has an electronically controlled damper link (e.g., 14L or 14R) coupled thereto, and also to embodiments in which both ends of sway bar 12 have an electronically controlled damper link (e.g., 14L and 14R, respectively) coupled thereto. Additionally, for purposes of conciseness and clarity, portions of the following description may refer to an electronically controlled damper link as "electronically controlled damper link 14", instead repeating the same description for each of electronically controlled damper link 14L and electronically controlled damper link 14R. It should be noted that such portions of the description are applicable to either electronically controlled damper link 14L or electronically controlled damper link 14R, as shown in sway bar system 100 of FIG. 1A. Further, the description will pertain to embodiments in which one end of sway bar 12 has an electronically controlled damper electronically controlled damper link (e.g., 14L or 14R) coupled thereto, and also to embodiments in which both ends of sway bar 12 have an electronically controlled damper link (e.g., 14L and 14R, respectively) coupled thereto.

Also included in FIG. 1A are body 202, through shaft 204, connector 206, and connection 213, further discussion of which is provided in the discussion of FIGS. 2-5 herein.

Figure 1B:
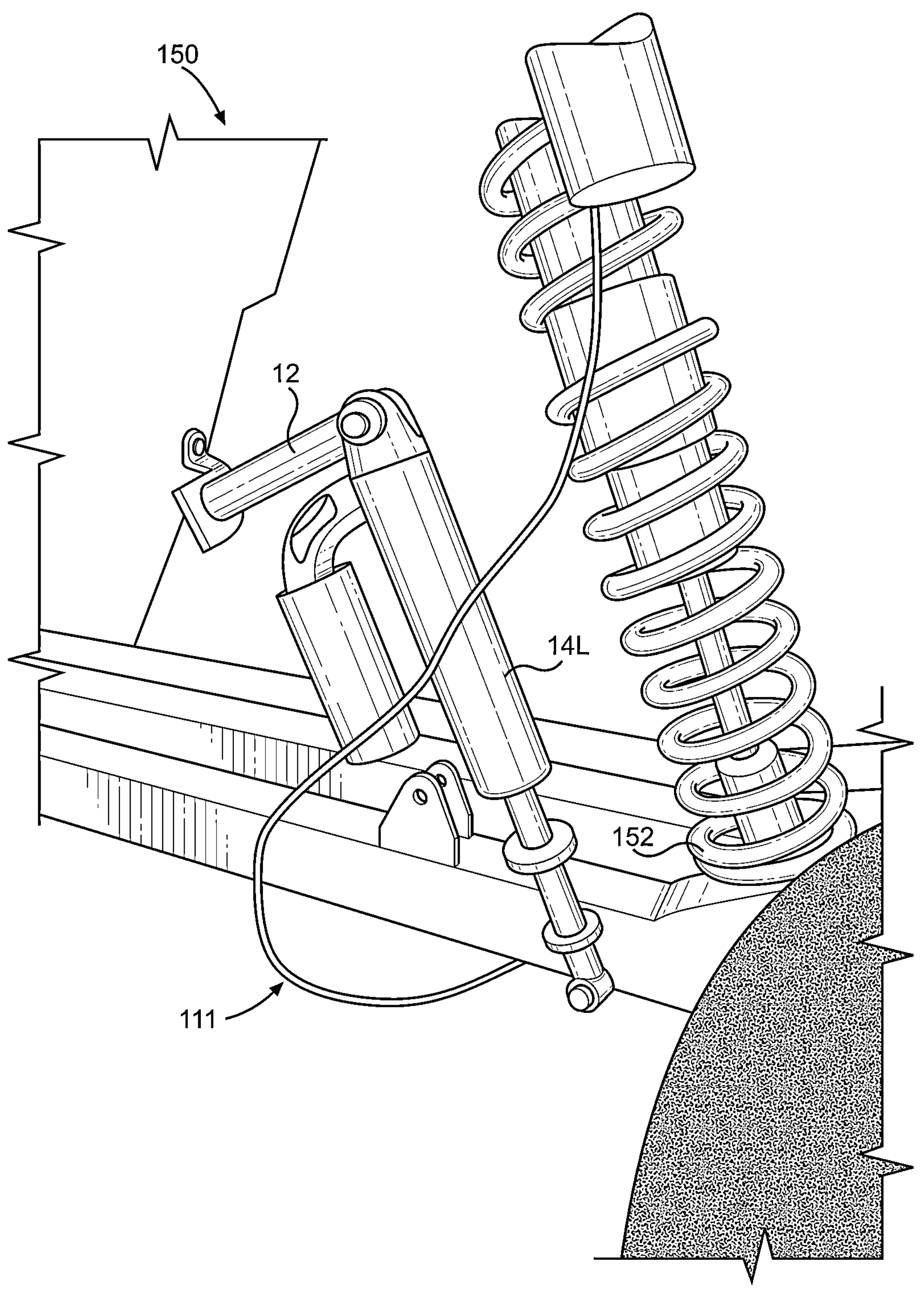
FIG. 1B is a perspective view of sway bar system, of FIG. 1A, installed in a vehicle, in accordance with one embodiment.

With reference now to FIG. 1B, a perspective view 150 is provided of sway bar system 100, of FIG. 1A, installed in a vehicle, in accordance with one embodiment. In the embodiment of FIG. 1B, sway bar 12 and at least one electronically controlled damper link 14L is shown installed in a vehicle 152. In one embodiment, sway bar system 100 is coupled to a vehicle with at least one end of sway bar 12 coupled to the vehicle by an electronically controlled damper link (e.g., 14L or 14R). That is, unlike conventional sway bar assemblies, in one embodiment, sway bar system 100 has one end of sway bar 12 coupled to a vehicle by an electronically controlled damper link (e.g., 14L or 14R).

In one embodiment, sway bar system 100 has both ends of sway bar 12 coupled to a vehicle by an electronically controlled damper link (e.g., 14L and 14R, respectively). As a result, and as will be described further below, the "stiffness" provided by sway bar system 100 can be remotely controlled by controlling the stiffness or compliance of one or both of electronically controlled damper links 14L and 14R coupling sway bar 12 to a vehicle. Importantly, FIG. 1B further shows a cable 111. Cable 111 is used to provide input to electronically controlled damper link 14. Such input is used to control the damping characteristics of electronically controlled damper link 14. In various embodiments, as are described below in detail, such input may consist of electrical input (based upon, e.g., user input, sensors-derived data, or any of various other sources) used to control an electronic valve within electronically controlled damper link 14 and, correspondingly, control the damping characteristics of electronically controlled damper link 14. Embodiments of the sway bar system 100 are also well suited to using a wireless signal (in addition to, or in lieu of, cable 111) to control a valve or other component of electronically controlled damper link 14 such that, ultimately, the damping characteristic of electronically controlled damper link 14 is controllable.

Figure 1C:
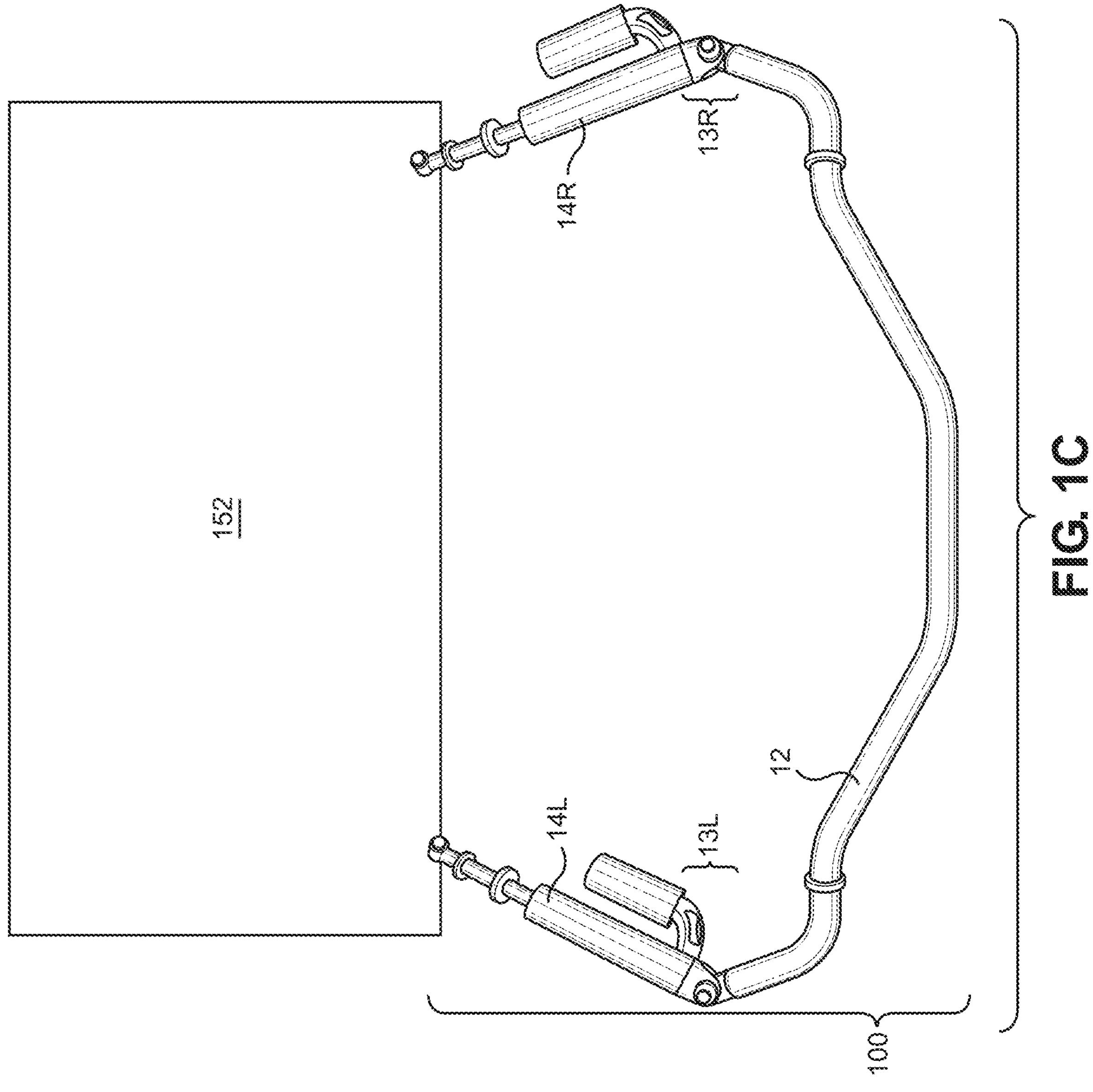
FIG. 1C is a perspective view is provided of sway bar system having electronically controlled damper link coupled to a first end of sway bar.

Referring now to FIG. 1C, a perspective view is provided of sway bar system 100 having electronically controlled damper link 14L coupled to a first end of sway bar 12 at location 13L. In the embodiment of FIG. 1C, sway bar system 100 further includes electronically controlled damper link 14R coupled to a second end of sway bar 12 at location 13R. Additionally, as schematically depicted in FIG. 1C, in the embodiment, electronically controlled damper link 14L is coupled to vehicle 152, and electronically controlled damper link 14R is coupled to vehicle 152. In one embodiment, electronically controlled damper link 14L and electronically controlled damper link 14R are coupled to vehicle 152 at a location, for example, near a wheel or axle (such as coupled to a control arm or other suspension feature) of vehicle 152 at respective left and right sides of vehicle 152. It will be understood that when the left and right sides of the suspension of vehicle 152 move relative to one another, sway bar 12 of sway bar system 100 is subjected to torsion and forced to twist. The twisting of sway bar 12 will transfer forces between a heavily-loaded suspension side of vehicle 152 to the opposite, lesser-loaded, suspension side of vehicle 152.

Figure 1D:
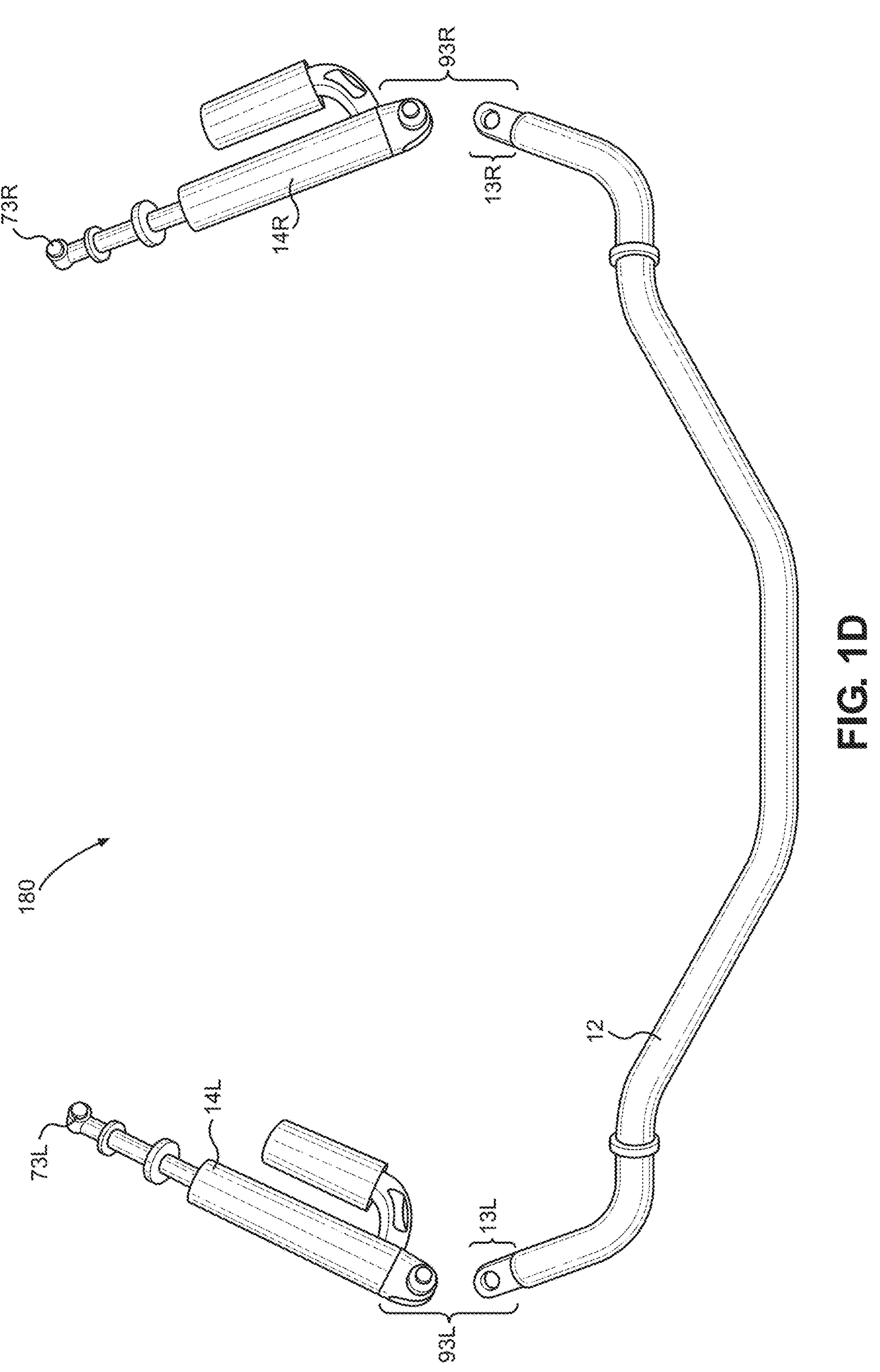
FIG. 1D is a perspective view of a sway bar system including a sway bar, two electronically controlled damper links, and two electronically controlled physical disconnects, in accordance with one embodiment.

Referring now to FIG. 1D, a perspective view of a sway bar system 180 including a sway bar 12, two electronically controlled damper links, e.g., electronically controlled damper link 14L and electronically controlled damper link 14R, and two electronically controlled physical disconnects, e.g., electronically controlled physical disconnect 93R and electronically controlled physical disconnect 93L, are shown in accordance with one embodiment. Although two electronically controlled physical disconnects are shown in FIG. 1D, it is appreciated that in another embodiment, sway bar 12 would have only a single electronically controlled physical disconnect, or a plurality of electronically controlled physical disconnect. Further, although two electronically controlled damper links are shown in FIG. 1D, it is appreciated that in another embodiment, sway bar 12 would have no electronically controlled damper links, one electronically controlled damper link, or a plurality of electronically controlled damper links.

For purposes of clarity, in FIG. 1D, electronically controlled damper link 14L and electronically controlled damper link 14R are shown slightly separated from sway bar 12 in order to more clearly depict the location of electronically controlled physical disconnect 93L, where electronically controlled damper link 14L would, in one embodiment, be physically coupled with, or physically disconnected from, sway bar 12 at connection 13L; and to more clearly depict the location of electronically controlled physical disconnect 93R, where electronically controlled damper link 14R would, in one embodiment, be physically coupled with, or physically disconnected from, sway bar 12 at connection 13R.

In one embodiments of sway bar system 180, electronically controlled physical disconnect 93L includes a linear actuator, rotary actuator, or other electronically controllable coupling feature (similar in functionality to the solenoid valve operation disclosed in remotely controllable active valve), to allow electronically controlled damper link 14L to be physically coupled with and physically disconnected from, sway bar 12 at connection 13L. Similarly, in one embodiments of sway bar system 180, electronically controlled physical disconnect 93R includes a linear actuator, rotary actuator, or other electronically controllable coupling feature (similar in functionality to the solenoid valve operation disclosed in remotely controllable active valve), to allow electronically controlled damper link 14R to be physically coupled with and physically disconnected from, sway bar 12 at connection 13R. It should be noted that in one embodiment, sway bar system 180 is not limited solely to the use of a bushing for electronically controlled physical disconnect 93L or electronically controlled physical disconnect 93R.

With reference still to FIG. 1D, in one embodiment of sway bar system 180, a portion of electronically controlled damper link 14L includes an eyelet 73L, or similar coupling feature, to readily enable coupling of electronically controlled damper link 14L to a location on a vehicle. Similarly, in one embodiment of sway bar system 180, a portion of electronically controlled damper link 14R includes an eyelet 73R, or similar coupling feature, to readily enable coupling of electronically controlled damper link 14R to a location on a vehicle. It should be noted one embodiment of sway bar system 180 uses a connection other than an eyelet for coupling one or both of electronically controlled damper link 14L and electronically controlled damper link 14R to a vehicle.

In one embodiment, the electronically controlled physical disconnect 93L (or electronically controlled physical disconnect 93R) is a portion of electronically controlled damper link 14L (or electronically controlled damper link 14R, respectively).

In one embodiment, electronically controlled physical disconnect 93L (or electronically controlled physical disconnect 93R) is a portion of electronically controlled damper link 14L (or electronically controlled damper link 14R, respectively) located at an opposite end of the eyelet 73L (or eyelet 73R, respectively) portion of electronically controlled damper link 14L (or electronically controlled damper link 14R, respectively).

Although, in one embodiment, sway bar system 180 is disclosed as having two electronically controlled damper links and two electronically controlled physical disconnects, it should be appreciated that other embodiments of sway bar system 180 would include a different number of electronically controlled damper links and/or electronically controlled physical disconnects, such as a single electronically controlled physical disconnect, or a plurality of electronically controlled physical disconnect, no electronically controlled damper links, one electronically controlled damper link, or a plurality of electronically controlled damper links, and the combinations therefrom as discussed in some of the examples below. Further, it should be understood that the following embodiments are provided for clarity, and are not meant to be exhaustive. Instead, one or more embodiments could include other configurations, additional electronically controlled damper links and/or electronically controlled physical disconnects which may be located at different locations along sway bar 12, and the like.

For example, in one embodiment, sway bar system 180 includes only a single electronically controlled damper link (e.g., electronically controlled damper link 14L or electronically controlled damper link 14R), and both of electronically controlled physical disconnect 93R and electronically controlled physical disconnect 93L. In one example of such an embodiment, electronically controlled damper link 14L is used at one end of sway bar 12 such as to couple with connection 13L, and a conventional end link (or the like) is coupled to the other connection 13R. Hence, sway bar system 180 is well suited to embodiments in which one end of sway bar 12 has an electronically controlled damper link (e.g., electronically controlled damper link 14L or electronically controlled damper link 14R) coupled thereto, and also to embodiments in which both ends of sway bar 12 have an electronically controlled damper link (e.g., electronically controlled damper link 14L and electronically controlled damper link 14R) coupled thereto.

In one embodiment, sway bar system 180 includes only a single electronically controlled damper link (e.g., electronically controlled damper link 14L or electronically controlled damper link 14R), and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and a conventional end link (or the like) is coupled to the other connection 13R without an electronically controlled physical disconnect 93R.

In another embodiment, electronically controlled damper link 14L is used at one end of sway bar 12 such as to couple with connection 13L without an electronically controlled physical disconnect 93L, and a conventional end link (or the like) is coupled to the other connection 13R having electronically controlled physical disconnect 93R.

In one embodiment, sway bar system 180 includes both electronically controlled damper link 14L and electronically controlled damper link 14R, and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and electronically controlled damper link 14R is coupled to the other connection 13R without an electronically controlled physical disconnect 93R.

In another example of such an embodiment, electronically controlled damper link 14L is used at one end of sway bar 12 such as to couple with connection 13L via without an electronically controlled physical disconnect 93L, and electronically controlled damper link 14R is coupled to the other connection 13R via electronically controlled physical disconnect 93R.

As such, sway bar system 180 is well suited to embodiments in which one or both ends of sway bar 12 have an electronically controlled damper links coupled thereto, and also to embodiments in which one or both ends of sway bar 12 are coupled to one or more electronically controlled damper links (and/or a conventional end link) via one or both of electronically controlled physical disconnects.

For purposes of conciseness and clarity, portions of the following description may refer to the electronically controlled physical disconnect as "electronically controlled physical disconnect 93", instead repeating the same description for each of electronically controlled physical disconnect 93L and electronically controlled physical disconnect 93R. It should be noted that such portions of the description are applicable to either electronically controlled physical disconnect 93L or electronically controlled physical disconnect 93R, as shown in sway bar system 180 of FIG. 1D. Further, the description will pertain to embodiments in which one or both ends of sway bar 12 have electronically controlled physical disconnects coupled therewith, and also to embodiments in which one or both ends of sway bar 12 are coupled to one or more electronically controlled damper links (and/or a conventional end link) via one or both of electronically controlled physical disconnects.

It should be understood that, in the following discussion, in another embodiment damper link 14L and 14R may be representative of different and/or other types of damper links such as, but not limited to, those seen in at least FIG. 2, FIG. 3, and FIG. 4. As such, discussions regarding damper link 14L and 14R are equally applicable to the embodiments shown in at least FIGS. 2-4.

Typically, sway bars can become expensive due to needing sensors to aid in the centering of the sway bar. For instance, when going from a disconnected state to a connected state a lot of sway bar systems need sensors to aid in balancing the forces to where the sway bar is level. There is also the possibility of the sway bar not being level when reconnecting if the wheels are not level. Embodiments discussed herein do not require sensors and are capable of self-centering.

Figure 2:
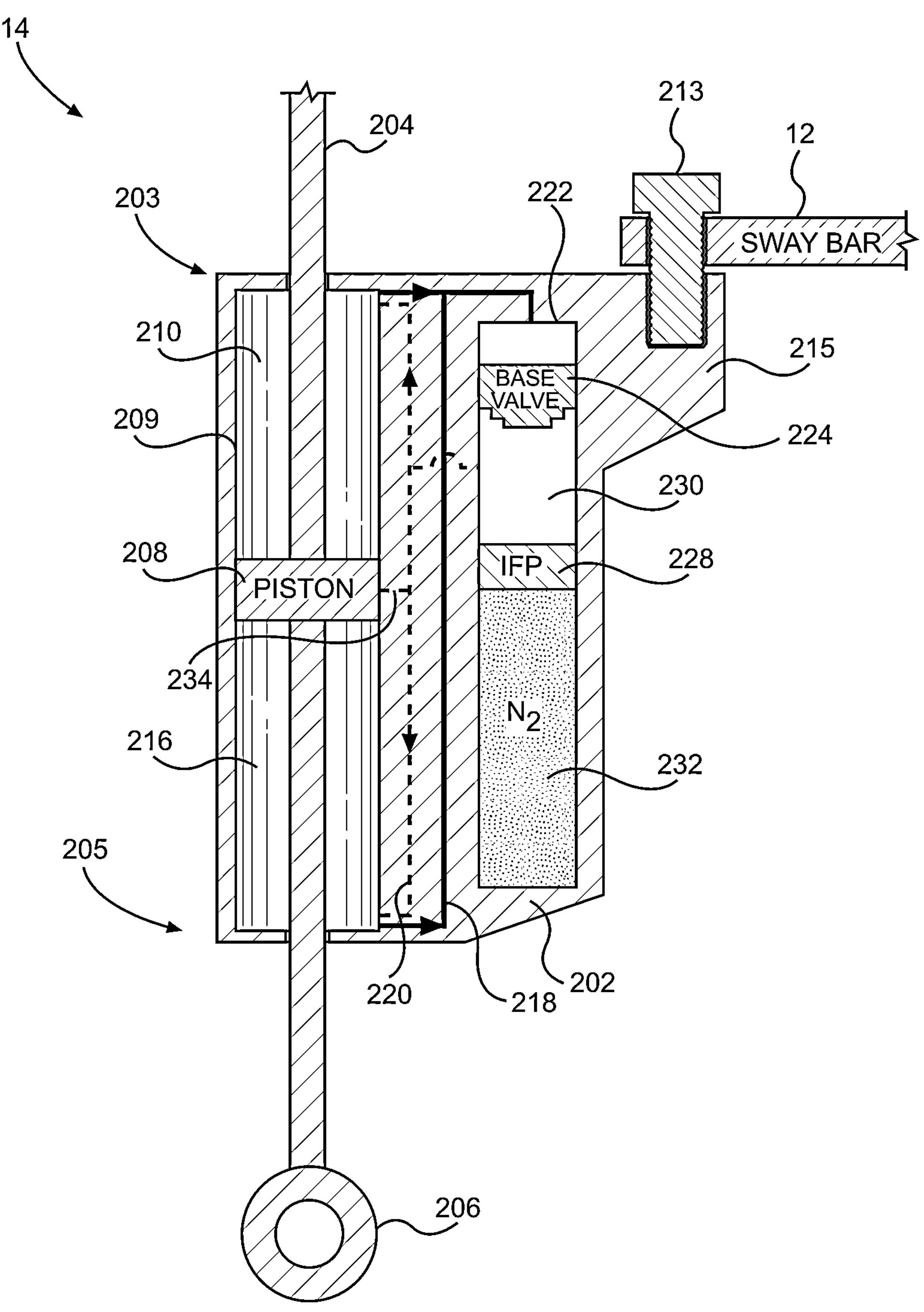
FIG. 2 is a cross section view of a damper link in an equilibrium position, according to one embodiment.

FIG. 2 is a cross section view of a damper link 14 in an equilibrium position, according to one embodiment. Also included are body 202, top end 203, through shaft 204, bottom end 205, connector 206, piston 208, damping chamber 209, first chamber 210, second chamber 216, high-pressure line 218, low-pressure line 220, reservoir 222, base valve 224, IFP 228, fluid side 230, gas side 232, center port 234, and connection 213.

In one embodiment, damper link 14 has a body 202 with a through shaft 204. Through shaft 204 assists in balancing the forces from vehicle 152 and sway bar 12 due to its ability to allow the piston 208 to move away from the equilibrium position towards either the top end 203 or the bottom end 205. It should be understood that the terms top and bottom are used for the sake of clarity and brevity, and are not intended to limit the embodiments.

In one embodiment, the equilibrium position is considered the position that the damping link 14 naturally rests at when no outside forces are acting on the damping link 14 or sway bar 12 (e.g., the vehicle stationary). In other words, the equilibrium position is the default resting position of the damping link 14. While in one embodiment the equilibrium position could be a center position, it is not required to be exactly centered, and may be biased towards the top end 203 or bottom end 205 in other embodiments.

In one embodiment, the equilibrium position is based on the fluid pressure within the system. In one embodiment, vehicle 152 and sway bar 12 to which the damping link 14 is coupled can affect the location of the equilibrium position. In one embodiment, the ambient temperature can affect the equilibrium position. In one embodiment, fluid pressure is what allows damping link 14 to maintain an equilibrium position, in other words as fluid moves through the system and exerts pressure on both sides of piston 208 then piston 208 will be inclined to rest in a position where the net force acting on it is zero. One benefit of this embodiment is that there is no need for a series of sensors and controllers to determine the ideal position for piston 208.

In one embodiment, through shaft 204 has a connector 206 on a first end to connect the damper link 14 to a vehicle. In one embodiment, connector 206 is an eyelet, or a similarly suitable connection. The through shaft 204 goes through body 202 and is coupled to a piston 208 that divides damping chamber 209 into a first chamber 210 and a second chamber 216. In one embodiment, piston 208 is vented. In one embodiment, piston 208 is solid.

In one embodiment, sway bar 12 is connected to body 202 via connection 213. In one embodiment, connection 213 is a screw, but other suitable connections may be utilized. In one embodiment, body 202 is shaped such that sway bar 12 is connected to a portion offset from the body. In other words, the portion of body 202 to which sway bar 12 connects is not in line with the damping chamber 209 or the reservoir 222, rather sway bar 12 connects to overhang 215. This structure allows for improved packaging of the system.

Other embodiments may be differently offset, for example the offset location may be more centrally located rather than at a top end 203 (e.g., in a lower position than shown in at least FIG. 2). In one embodiment, sway bar 12 is offset to be higher than what is shown in at least FIG. 2. This may be done by having overhang 215 extend vertically as well as radially, or by utilizing a connection 213 that adds height. Both the vertical and radial offset distance may vary and are not limited to the offset position shown in at least FIG. 2. Alternatively, a different connection 213 may be used to increase or decrease the offset compared to what is shown in at least FIG. 2.

In one embodiment, sway bar 12 is not offset and may connect to a top end 203 of body 202 via an eyelet, or a similarly applicable connection type. In one embodiment, sway bar 12 is not offset and connects to a location along body 202 other than top end 203.

In one embodiment, there are seals where through shaft 204 enters and exits body 202 to prevent fluid from leaking out of the damping link 14.

As sway bar 12 moves, piston 208 will move towards the top end 203 or bottom end 205 depending on the direction the sway bar 12 moves. As piston 208 moves in either direction, fluid will flow through the high-pressure line 218 and into reservoir 222. An internal floating piston (IFP) 228 is located within reservoir 222 to divide reservoir 222 into a fluid side 230 and a gas side 232. In one embodiment, the gas side 232 contains nitrogen, or a similar suitable gas. The IFP is located such that it will not obstruct the entrance to the low-pressure line 220. In one embodiment, base valve 224 is also located within reservoir 222 such that after fluid enters reservoir 222 from high-pressure line 218, fluid then flows through base valve 224 before it can enter low-pressure line 220.

In one embodiment, after fluid flows through high-pressure line 218 and base valve 224, fluid will then enter low-pressure line 220 and return to either the first chamber 210 or second chamber 216, depending on the direction of the stroke. For example, if piston 208 moves towards top end 203, fluid will flow out of the first chamber 210 into the high-pressure line 218, into reservoir 222, through low-pressure line 220, and into the second chamber 216. Similarly, if piston 208 moved towards bottom end 205 then fluid will flow out of the second chamber 216 into the high-pressure line 218, into reservoir 222, through low-pressure line 220, and into the first chamber 210.

In one embodiment, high-pressure line 218 has a check to limit fluid flow to a single direction. In one embodiment, low-pressure line 220 has a check to limit fluid flow to a single direction opposite of high-pressure line 218.

In one embodiment, the inlets to the high-pressure line 218 and the outlets to the low-pressure line 220 are formed by apertures in the wall of damping chamber 209. In one embodiment, the inlets to the high-pressure line 218 and the outlets to the low-pressure line 220 are formed by apertures in the top and bottom of damping chamber 209. In one embodiment, one of the inlets to the high-pressure line 218 and the outlets to the low-pressure line 220 are formed by at least one aperture in the top and/or bottom of damping chamber 209, while the other is formed by at least one aperture in the wall of damping chamber 209. In one embodiment, there are at least two inlets to high-pressure line 218. In one embodiment, there are at least two outlets to low-pressure line 220.

In one embodiment, the inlets to the high-pressure line 218 are located at the top end 203 and bottom end 205 of damping chamber 209. In one embodiment, the inlets to the high-pressure line 218 are located approximately at the top end 203 and bottom end 205 of damping chamber 209. In one embodiment, the inlets to the high-pressure line 218 are located within 20% of the top end 203 and bottom end 205 of damping chamber 209. In one embodiment, the inlets to the high-pressure line 218 are located such that they will be blocked by piston 208 once piston 208 has traveled the distance of an average stroke. In one embodiment, high-pressure line 218 fluidly coupled the damping chamber 209 to the reservoir 222 and allows fluid flow from the first chamber 210 and the second chamber 216 to the reservoir 222.

In one embodiment, the outlets of low-pressure line 220 are located at the top end 203 and bottom end 205 of damping chamber 209. In one embodiment, the outlets of low-pressure line 220 are located approximately at the top end 203 and bottom end 205 of damping chamber 209. In one embodiment, the outlets of low-pressure line 220 are located within 20% of the top end 203 and bottom end 205 of damping chamber 209. In one embodiment, the outlets of low-pressure line 220 are located such that they will be blocked by piston 208 once piston 208 has traveled the distance of an average stroke. In one embodiment, low-pressure line 220 fluidly coupled the damping chamber 209 to the reservoir 222 and allows fluid flow from the reservoir to the first chamber 210 and the second chamber 216.

In one embodiment, piston 208 can cover and instance of both the inlet to the high-pressure line 218 and the outlet to the low-pressure line 220 simultaneously (e.g., the inlet and outlet at or near top end 203). In one embodiment, the inlet to the high-pressure line 218 and the outlet to the low-pressure line 220 are located such that piston 208 will fully cover one before the other.

In one embodiment, low-pressure line 220 also has a center port 234 as an outlet, where center port 234 is located such that it is obstructed by piston 208 while damping link 14 is in an equilibrium position. In one embodiment, fluid flowing back into the first chamber 210 or second chamber 216 though the center port 234 allows for extra damping when returning to the equilibrium position. In other words, the extra resistance to back flow granted by the center port 234 allows for a gradual return to equilibrium rather than a snappier motion. In one embodiment, center port 234 is formed by an aperture in the wall of damping chamber 209.

In one embodiment, the high-pressure line 218 and the low-pressure line 220 are channels within body 202. In one embodiment, damping chamber 209 and reservoir 222 are formed by body 202. In one embodiment, body 202 is comprised of damping chamber 209 and reservoir 222. In one embodiment, damping chamber 209 and reservoir 222 are separate components that are coupled together.

In one embodiment, base valve 224 is located within reservoir 222, and is fluidly located between the exit of the high-pressure line 218 and the entrance to low-pressure line 220. In one embodiment, base valve 224 is placed to allow flow through the side with less flow (e.g., the base valve 224 is placed on a rebound side in line with the system). In one embodiment, base valve 224 has valving to limit the direction of fluid flow. In one embodiment, the valving of base valve 223 controls fluid flow between high-pressure line 218 and low-pressure line 220, and limits the direction of fluid flow to from the high-pressure line to the low-pressure line.

The available fluid volume within a damping chamber changes as the piston shaft moves in and out of the damping chamber. For example, the amount of damping fluid which can be held within the damping chamber is reduced when the shock assembly is completely compressed such that the piston shaft is largely within the damping chamber (thereby displacing damping fluid by the volume of the shaft). In a typical shock assembly, there is a compressible gas volume in fluid communication with the damping chamber to allow the shaft displaced fluid volume to be taken up by compression of the compressible gas volume. Deleteriously, during operation of the shock assembly in rapid compression under relatively high load, the compressible gas volume can be suddenly collapsed (if the pressure induced by the load is much higher than the gas volume pressure and such pressure can be freely communicated to the gas volume) thereby subverting the damping operation of the piston and allowing the piston to fully compress into the damping chamber at a high rate. During such a compression event, damping fluid is not properly transferred to the rebound side of the damping piston and a vacuum is created or "pulled" on the rebound side of the piston due to lack of timely fluid back fill. That vacuum "bubble" then collapses as the compression rate slows near completion of the loading event which caused the rapid compression. Such vacuum formation and collapse are known as cavitation and that can be both damaging to hardware and quite noisy. It is desirable to prevent such a cavitation event (and the corresponding malfunction of the damper under high load).

This problem may be solved using a device to meter fluid flow from the compression side of the damping piston to the compressible gas volume.

A base valve (e.g., a base plate). In different embodiments, a base valve is similar to a piston in that it may have holes, shims and a jet in its center. Often, the base valve is fixed in the damping chamber, usually between the piston and the IFP to create a third chamber therein. Basically, during the compression stroke, the base valve allows the displacement of a volume of working fluid equal to the shaft volume entering the damping chamber, which moves the IFP. However, the base valve also maintains the resistance necessary to force working fluid through the piston. During the rebound stroke, the gas behind the IFP presses outward and working fluid is able to move through the base valve back into the compression chamber.

As such, the base valve allows a decrease (or even elimination) of a pressure of the gas in the shock assembly. Moreover, the base valve prevents cavitation in the working fluid, but doesn't increase the force necessary to move the shaft. This allows the shock assembly to respond better at low shaft speeds, such as for example on a smoother surface, where the shaft isn't moving as quickly as it would if the vehicle were traversing a lot of bumps.

Base valve 224 may be a modal valve, a semi active valve, an active valve, a passive valve, an IQS valve, etc. Base valve 224 may be controlled remotely or manually, depending on the embodiment.

In one embodiment, base valve 224 controls the flow between damping chamber 209 and reservoir 222, such that it provides the ability to provide a rigid sway bar connection and a loose sway bar connection. In one embodiment, when base valve 224 allows fluid flow it provides a loose sway bar connection. In one embodiment, putting base valve 224 in a locked-out state provides a rigid sway bar connection. In one embodiment, base valve 224 can be locked out such that fluid is unable to flow through base valve 224. Locking out base valve 224 would lead to the piston 208 automatically returning to its equilibrium position and locking out there. This locked out state would allow for the sway bar 12 to hold a consistent position, which would make disengaging and reengaging sway bar 12 easy compared to electronic systems, which have a tendency of disengaging and reengaging the sway bar 12 against the users will. In one embodiment, base valve 224 is locked out remotely. In one embodiment, base valve 224 is locked out manually. In one embodiment, base valve 224 may be manually adjusted via a knob, switch, or similarly applicable mechanism.

In one embodiment, damper link 14 is only utilized on a single side of sway bar 12. In such an embodiment, costs would be reduced while the sway bar 12 is still capable of self-centering.

In one embodiment, damper link 14 is on both sides of sway bar 12 as seen in at least FIG. 1A. One benefit of having two instances of damper link 14 would be that the sway bar 12 would perform better in high load systems and would have more travel than if only one instance of damper link 14 was utilized.

Figure 6:
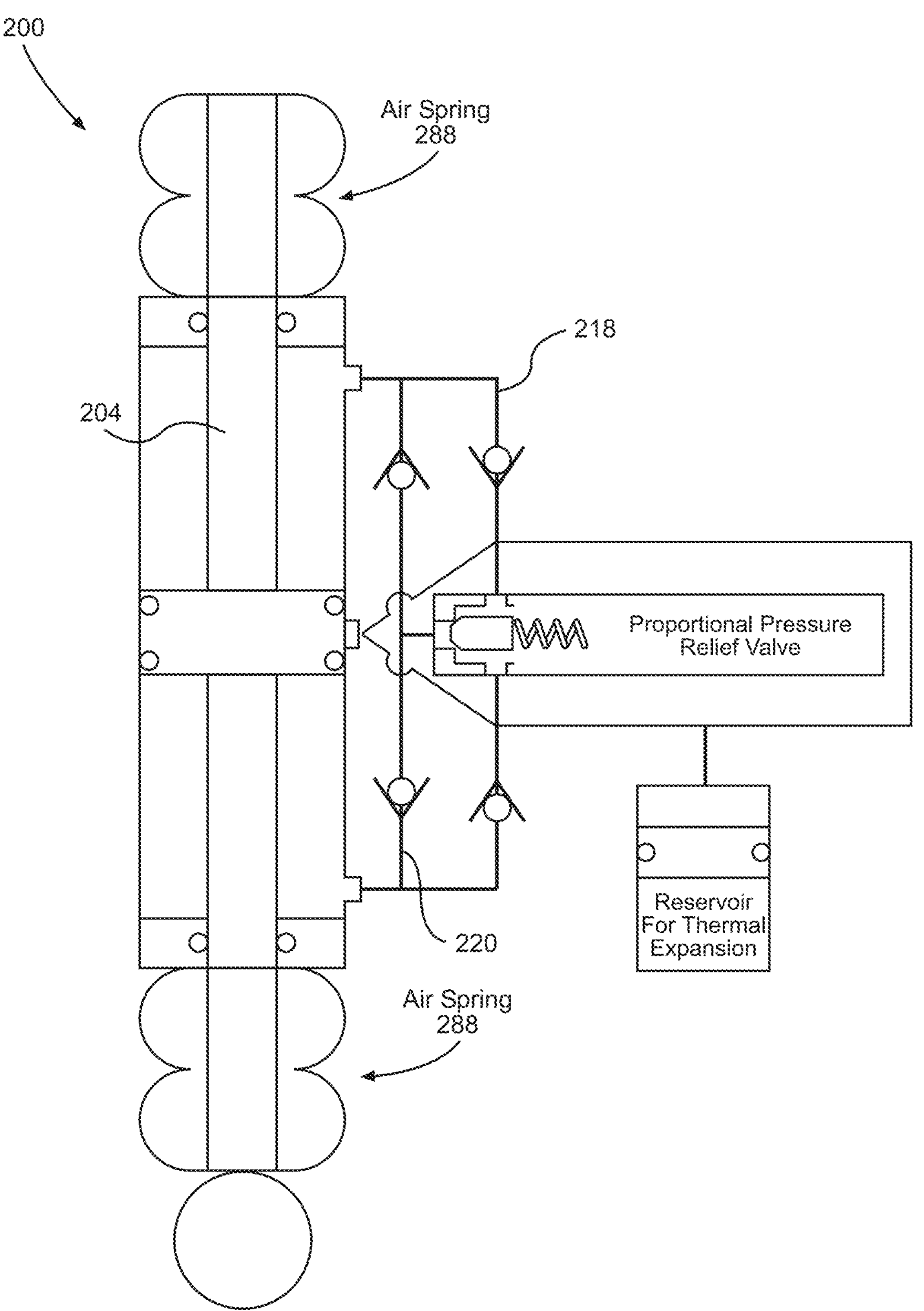
FIG. 6 is a diagram of a damping link in an equilibrium position with air springs, according to one embodiment.

FIG. 6 is a diagram of a damping link 200 in an equilibrium position with air springs 288, according to one embodiment. In one embodiment, air springs 288 are placed along through shaft 204 at each end of the body 202.

Air springs 288 have the additional benefit of adjusting the position of the damping link 200 with respect to the frame connection, as well as adjusting the essential stiffness of sway bar 12. In one embodiment, air springs 288 can be used to adjust the stiffness of sway bar 12 without having to remove and alter sway bar 12. For example, by adding air springs 288 to damping link 200, the stiffness of sway bar 12 can be lowered.

In one embodiment, air springs 288 assist with first stage damping control before going into piston controlled damping, and will also assist the piston controlled damping. In one embodiment, air springs 288 are controlled with an active system and pump. In one embodiment, air springs 288 are controlled with a passive system and standard pump.

Similar to how damping link 200 can be utilized on either one or both sides of sway bar 12, air springs 288 can also be utilized on one or both sides of sway bar 12. For example, one side of sway bar 12 would have damping link 200 while the other side utilizes air springs 288. Alternatively, air springs 288 can be utilized on the same side as damping link 200 on through shaft 204, as seen in at least FIG. 6. In another embodiment, damping link 200 is utilized on both sides of sway bar 12, and air springs 288 can be present on either one or both of the damping links in such an embodiment.

Air spring 288 can be external or internal to the damping link 200 as needed. In one embodiment, damping link 200 has at least one sealed chamber and at least one internal floating piston to form air springs 288.

Figure 7:
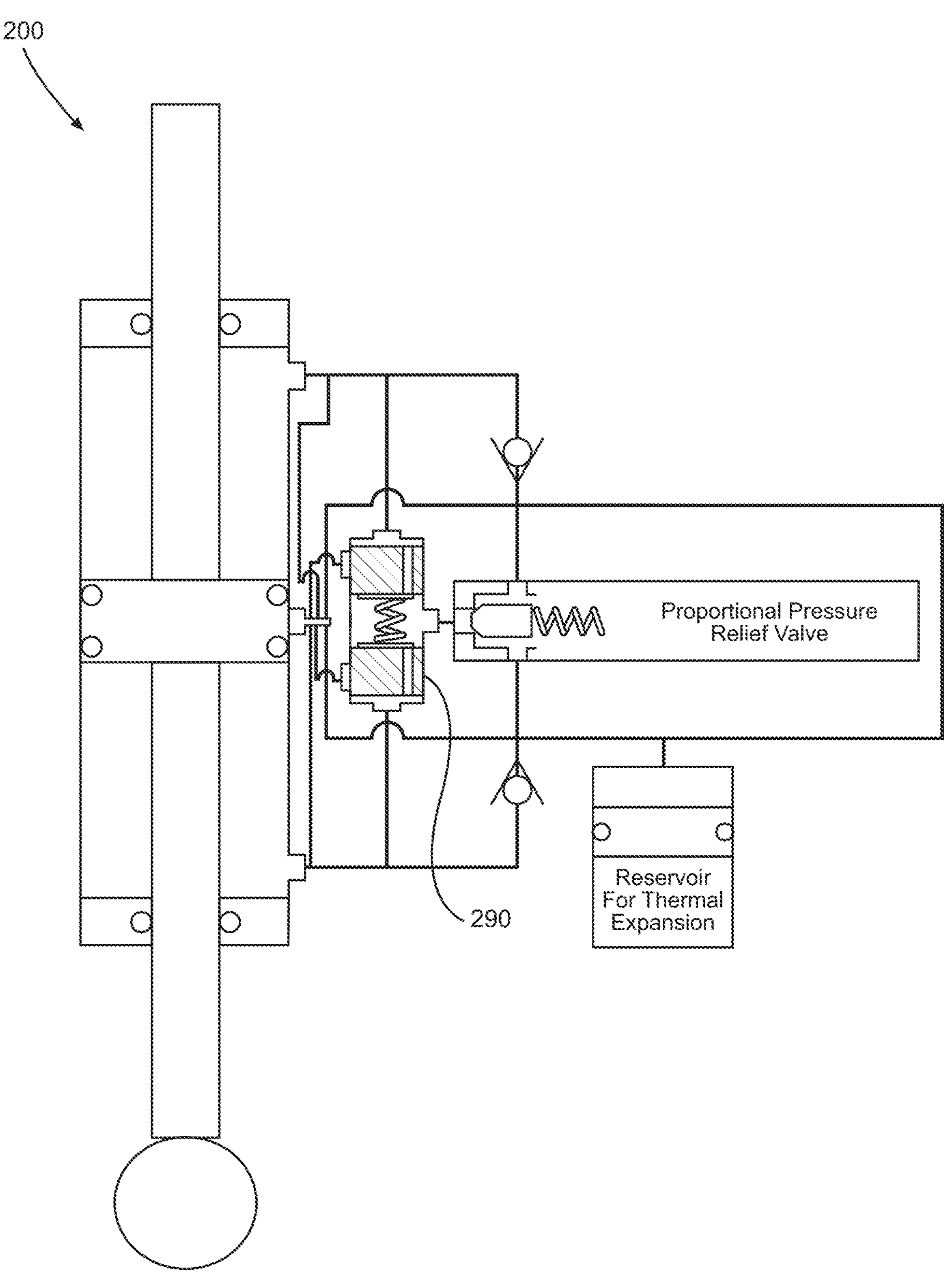
FIG. 7 is a diagram of a damping link in an equilibrium position with a two-stage valve, according to one embodiment.

FIG. 7 is a diagram of a damping link 200 in an equilibrium position with a two stage valve 290, according to one embodiment. One benefit of a two-stage valve would be that it allows for a higher flow rate and increased oil volume. A two-stage valve would also allow for an increase in the range of the softer settings while maintaining the vehicle's ability to retain control under high force activities.

Figure 8:
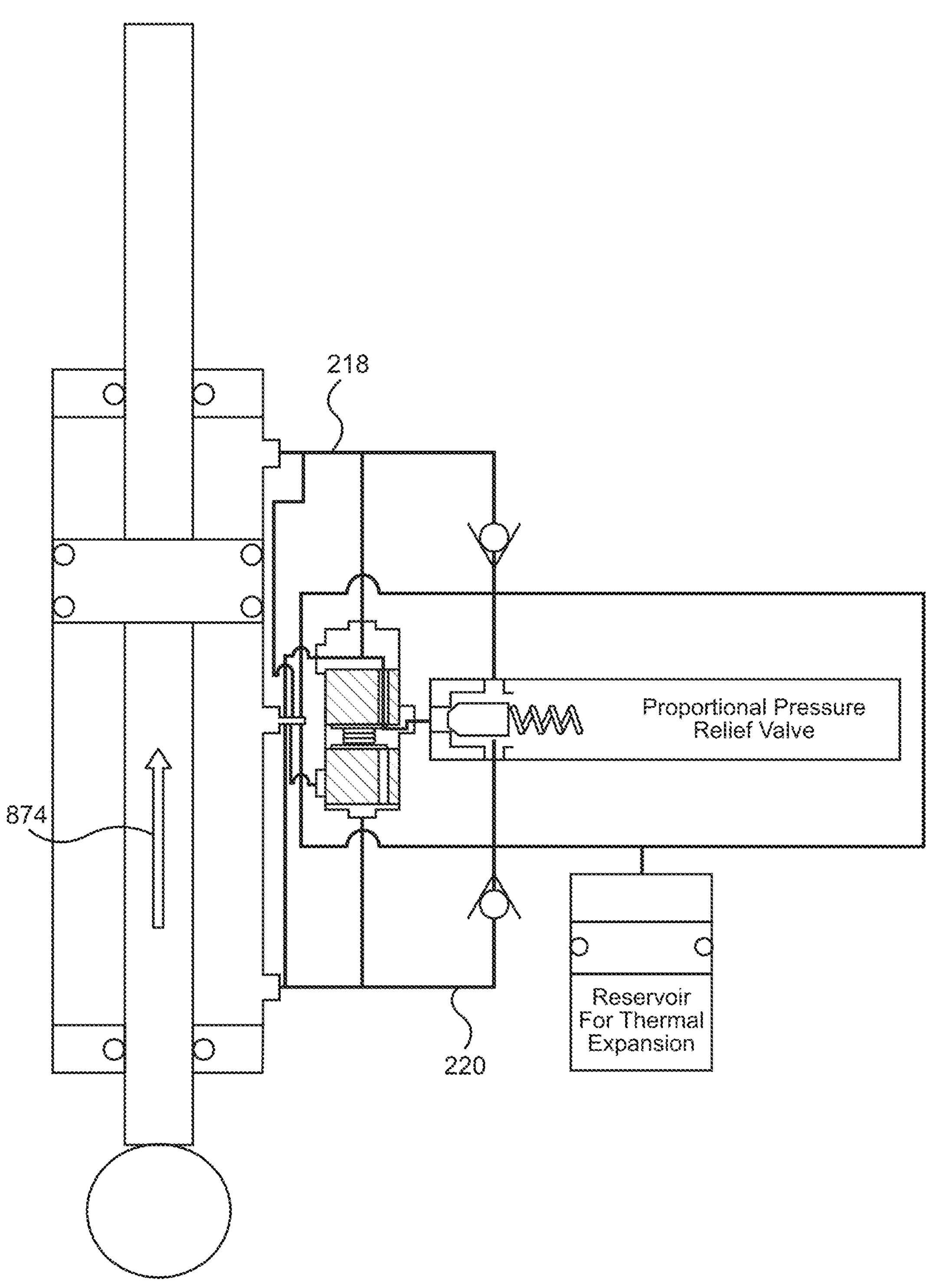
FIG. 8 is a diagram of a damping link in a first position with a two-stage valve, according to one embodiment.

FIG. 8 is a diagram of a damping link in a first position with a two-stage valve, according to one embodiment. In FIG. 8, arrow 874 is used to show the direction of movement of through shaft 204. In one embodiment, as piston 208 moves up fluid will flow out of first chamber 210 and flow into high pressure line 218. Then, fluid will flow into the two-stage valve 290, which acts to at least control the fluid flow into base valve 244. As seen in at least FIG. 8, the check within the two stage valve 290 will allow fluid to flow from the high pressure line 218 into the base valve 224, but not in the other direction. Fluid will then pass through the low pressure line 220 into the second chamber 216.

Figure 9:
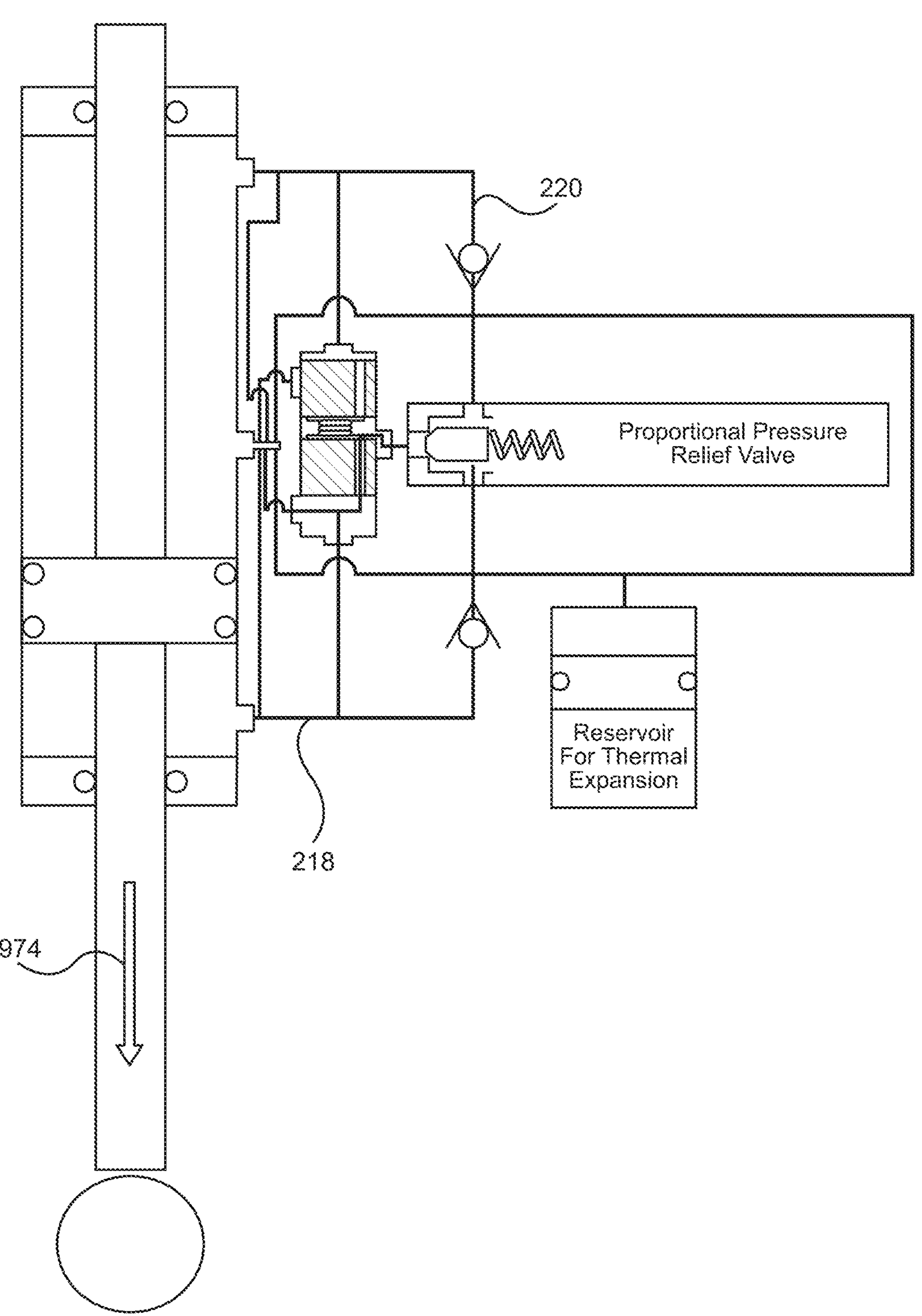
FIG. 9 is a diagram of a damping link in a second position with a two-stage valve, according to one embodiment.

FIG. 9 is a diagram of a damping link in a second position with a two-stage valve, according to one embodiment. In FIG. 9, arrow 974 is used to show the direction of movement of through shaft 204. In one embodiment, as piston 208 moves down fluid will flow out of second chamber 216 and flow into high pressure line 218. Then, fluid will flow into the two-stage valve 290, which acts to at least control the fluid flow into base valve 244. As previously stated, the check within the two-stage valve 290 will allow fluid to flow from the high-pressure line 218 into the base valve 224, but not in the other direction. Fluid will then pass through the low-pressure line 220 into the second chamber 216.

Reservoir 222 is fluidly coupled to at least low-pressure lines 220 to accommodate fluid movement and thermal expansion.

Figure 3:
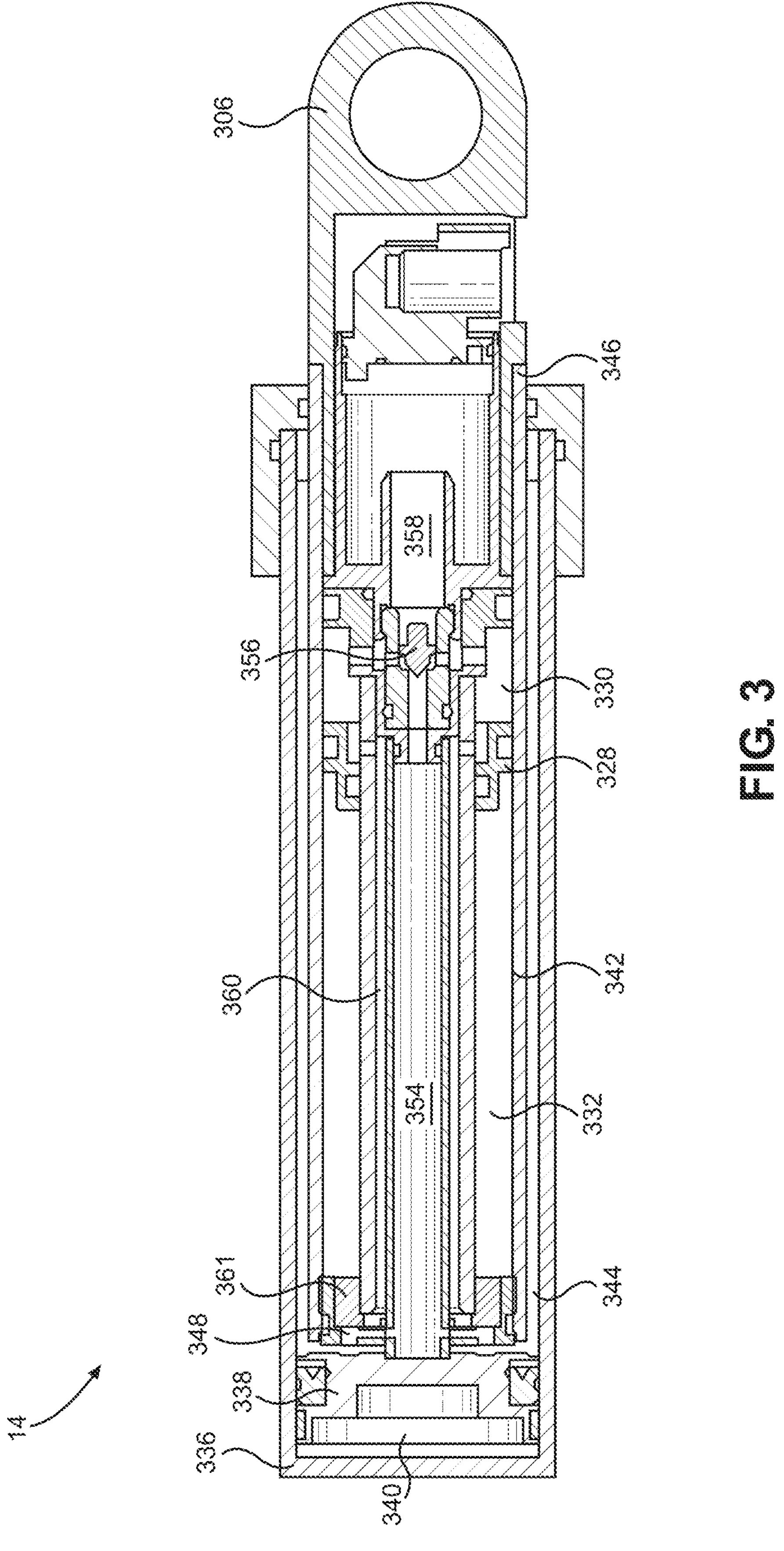
FIG. 3 is a cross section of a damping link in a pull shock configuration, according to one embodiment.

FIG. 3 is a cross section of a damping link 14 in a pull shock configuration, according to one embodiment. Also included are outer body 336, bearing housing 338, connector 306, gas chamber 340, reservoir 342, main shaft 346, main chamber 354, gap 344, passage 348, valve 356, rebound side 330, gas side 332, IFP 328, pressure chamber 358, and rebound passage 360.

In one embodiment, the damping link 14 has a pull shock configuration. In such a configuration, reservoir 342 and valves would be inside the shaft. One benefit of such an embodiment is that the spring rate can be reduced to allow for more compliance in different scenarios and expand the operating range of the sway bar. For instance, this arrangement allows for bump compliance without upsetting the vehicle (e.g., lifting a tire) if the sway bar is allowed to soften quickly.

Another benefit of this embodiment is that a larger sway bar 12 can be utilized in the system, which would benefit heavier vehicles that want as little roll as possible (e.g., when towing another vehicle or trailer). The embodiment shown in at least FIG. 3 allows for stability without being a detriment to other aspects of the system.

In the embodiment shown in at least FIG. 3, the sway bar 12 can couple to the damping link 14 anywhere on the outer body 336. In this embodiment, the sway bar 12 would utilize a connector such as an eyelet, bracket, or a similarly applicable connector. The ability to couple the sway bar 12 to the damping link 14 anywhere along the outer body 336 allows for a single sized damping link 14 to be utilized for different vehicles that would otherwise need differently sized damping links to function properly. For instance, mounting the sway bar 12 close to connector 306 would allow sway bar 12 to have more travel than if it was mounted at the end opposite of connector 306. In this embodiment, connector 306 is used to couple the damping link 14 to vehicle 152.

In one embodiment, there are two instances of damping link 14 utilized with sway bar 12, similar to the setup seen in at least FIG. 1A.

Bearing housing 338 is used to isolate gas chamber 340. In one embodiment, gas chamber 340 utilizes a gas such as nitrogen to balance out the pressure in the reservoir 342 and make the movement of damping link 14 softer. Passage 348 runs through bearing housing 348 to fluidly couple at least gap 344 and main chamber 354.

In one embodiment, there is a gap 344 between the outer body 336 and the main shaft 346. Gap 344 is filled with a small volume of fluid and is sealed with bearing housing 338 on a first end, where bearing housing 338 is coupled to the main shaft 346. As the damping link 14 is extended, where main shaft 346 and bearing housing 338 move out of outer body 336, gap 344 will decrease in volume and force fluid to flow out through passage 348, into main chamber 354, through valve 356, and into the rebound side 330 of reservoir 342. In one embodiment, reservoir 342 is divided into a rebound side 330 and a gas side 332 by IFP 328. As fluid flows into the rebound side 330 the IFP 328 will move towards the bearing housing 338 to accommodate for the volume change. In one embodiment, IFP utilizes O-rings to prevent the contents of rebound side 330 and gas side 332 from mixing.

In one embodiment, valve 356 is an electronic valve. In one embodiment, valve 356 is a high-pressure valve where pressure chamber 358 has a high-pressure to bias valve 356 towards a closed position. In one embodiment, valve 356 can be manually adjusted via a knob that is threaded to open and close the passage. In one embodiment, valve 356 is a one-way valve.

As the damping link contracts in a rebound stroke, the expansion of gap 344 will draw fluid out of the rebound side 330 though rebound passage 360, through disk 361, and back into gap 344. In one embodiment, there is at least one check valve in the rebound flow path to prevent fluid flow during extension. In one embodiment, disk 361 is coupled to a shim or shim stack to ensure that fluid will not flow through disk 316 as damping link 14 is being extended. In one embodiment, disk 361 comprises flow passages that are part of the rebound fluid flow path. In one embodiment, the fluid flow path that runs through disk 361 fluidly coupled to an additional passage, similar to passage 348, in bearing housing 338 that is on a plane different than the one shown in at least FIG. 3. In one embodiment, passage 348 is utilized in the rebound fluid flow path.

Figure 4:
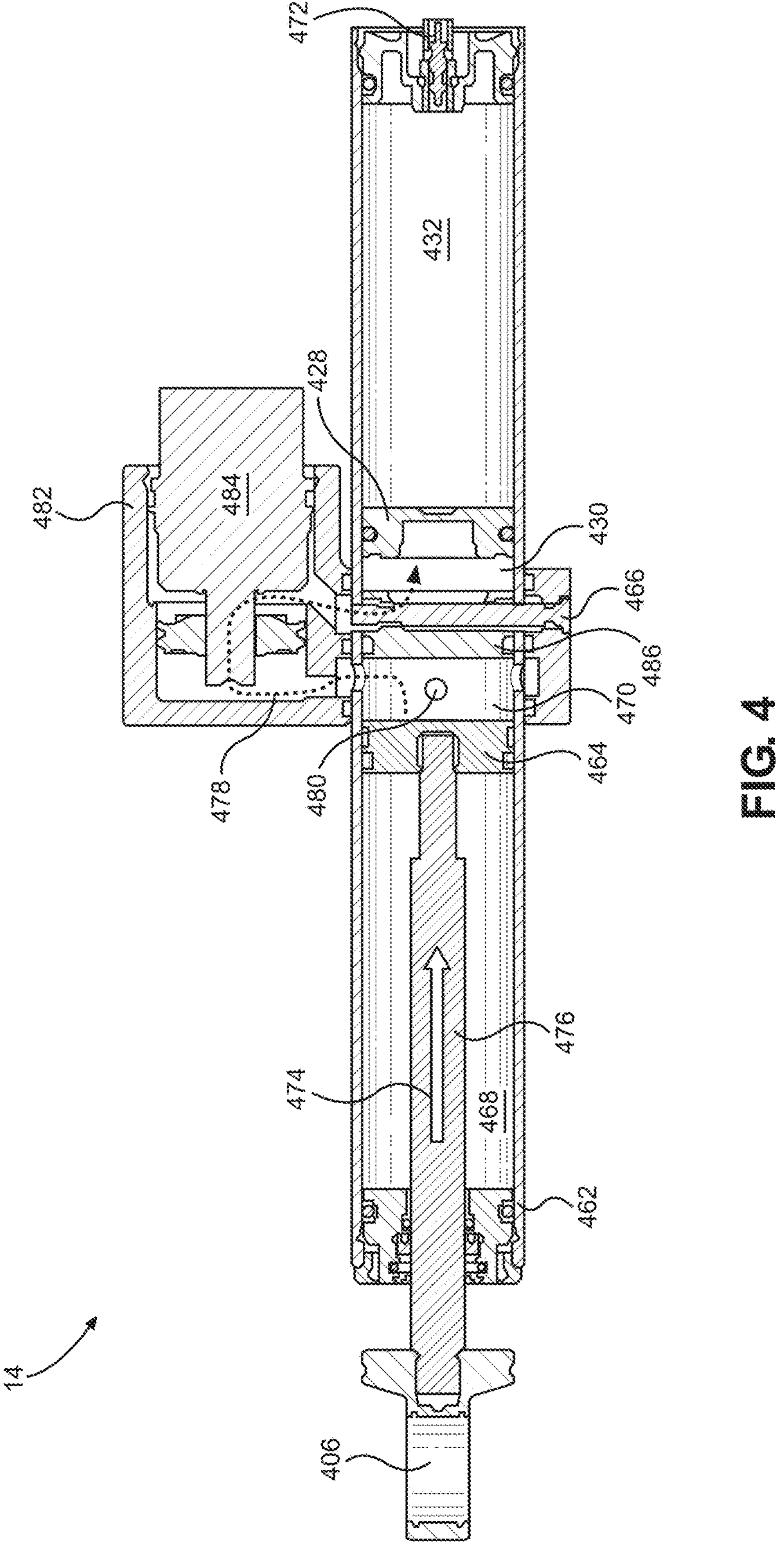
FIG. 4 is a cross section view of a damping link of an in-line configuration in a compression stroke, according to one embodiment.

FIG. 4 is a cross section view of a damping link 14 of an in-line configuration in a compression stroke, according to one embodiment. Also included are cylinder 462, connector 406, main piston 464, separator piston 466, first gas chamber 468, first fluid chamber 470, second gas chamber 432, second fluid chamber 430, IFP 428, pressure valve 472, arrow 474, shaft 476, bypass 480, valve housing 482, base valve 484, stopper 486, and directional line 478.

Similar to the damping link 14 shown in at least FIG. 3, the sway bar 12 can couple to the damping link 14 shown in at least FIG. 4 anywhere on cylinder 462. In this embodiment, the sway bar 12 would utilize a connector such as an eyelet, bracket, or a similarly applicable connector. The ability to couple the sway bar 12 to the damping link 14 anywhere along cylinder 462 allows for a single sized damping link 14 to be utilized for different vehicles that would otherwise need differently sized damping links to function properly. For instance, mounting the sway bar 12 close to connector 406 would allow sway bar 12 to have more travel than if it was mounted at the end opposite of connector 406. Connector 406 is used to mount damping link 14 to vehicle 152.

In one embodiment, separator piston 466 separates cylinder 462 into two sections. In one embodiment, separator piston 466 is formed from the same piece of material as the rest of cylinder 462. In one embodiment, separator piston 466 is installed in cylinder 462.

In one embodiment, main piston 464 is solid and does not allow flow through and divides a first section of cylinder 462 into a first gas chamber 468 and a first fluid chamber 470. On the other side of separator piston 466, an IFP 428 divides a second section of cylinder 462 into a second gas chamber 432 and a second fluid chamber 430. In one embodiment, the gas pressure in the first and second gas chamber 468, 432 can be adjusted via valves (e.g., pressure valve 472).

In one embodiment, adding pressure to the second gas chamber 432 assists in balancing out the pressure in damping link 14, and limit the initial pressure build that needs to be surpassed before the system can move. In one embodiment, first gas chamber 468 is a vacuum. In one embodiment, first gas chamber 468 is a low-pressure chamber.

Arrow 474 shows the direction the shaft 476 and main piston 464 are moving in FIG. 4. As the system is compressed, directional line 478 shows how the fluid would flow out of the first fluid chamber, through bypass 480, into valve housing 482, through base valve 484, and into the second fluid chamber 430. As fluid enters the second fluid chamber 430, the IFP 428 would move to compress the gas in second gas chamber 432.

In one embodiment, stopper 486 is used to limit the movement of shaft 476 and main piston 464 such that main piston 464 does not go past the ports for bypass 480, in which case the fluid and gas could mix. In one embodiment, separator piston 466 is thicker such that stopper 486 is not required.

Base valve 484 may be a modal valve, a semi active valve, an active valve, a passive valve, an IQS valve, a two stage valve, etc. base valve 484 may be controlled remotely or manually, depending on the embodiment. In one embodiment, valve housing 482 is used to house base valve 484. In one embodiment, valve housing 482 is suitable for housing alternative types of valves. In one embodiment, an adapter can be used with valve housing 482 to accommodate for differently sized valves. In one embodiment, valve housing maintains its alignment and position by interacting with a portion of separator piston 466 that extends past the walls of cylinder 462.

Figure 5:
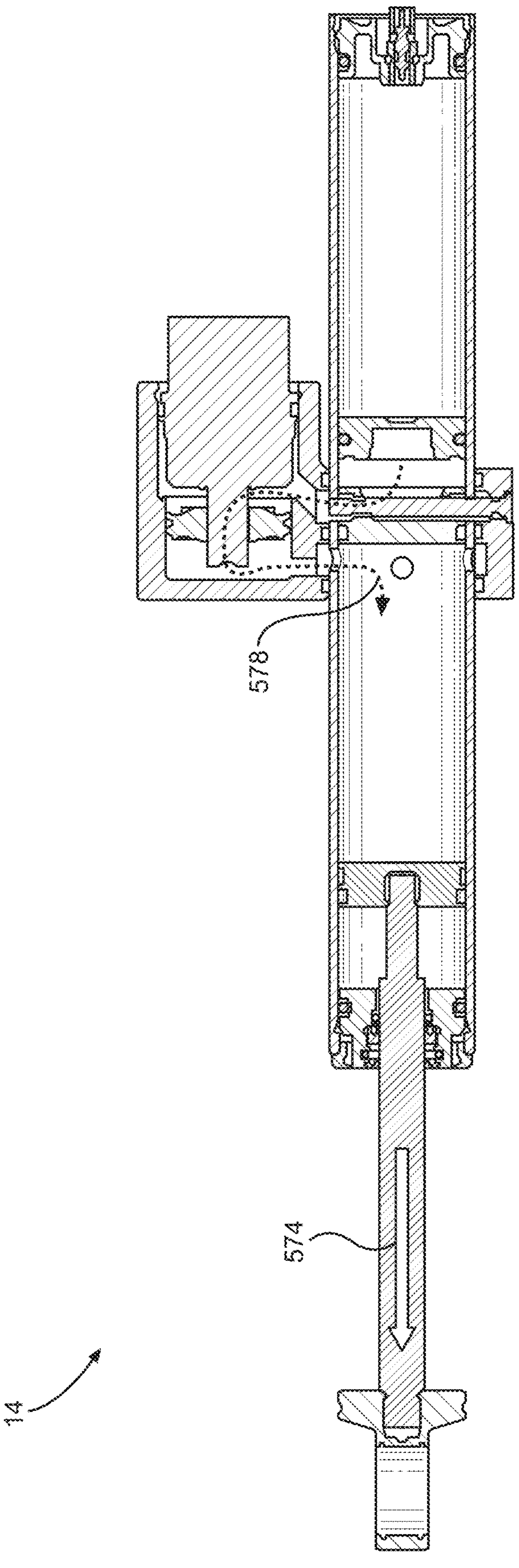
FIG. 5 is a cross section view of a damping link of an in-line configuration in a rebound stroke, according to one embodiment.

FIG. 5 is a cross section view of a damping link 14 of an in-line configuration in a rebound stroke, according to one embodiment. Arrow 574 shows the direction in which the shaft 476 and main piston 464 are moving, while directional line 578 shows the fluid flow path. As the damping link is extending, fluid will flow out of second fluid chamber through bypass ports (present on another plane) into the valve housing 482, through base valve 484, and out bypass 480 into the first fluid chamber 470.

In one embodiment, only a single instance of damping link 14 is utilized with a sway bar 12. In one embodiment, two instances of damping link 14 are utilized with sway bar 12, similar to the configuration shown in at least FIG. 1A-D.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A sway bar system comprising: a damping link that couples a first end of a sway bar to a first location on a vehicle, wherein said damping link comprises: a body comprising a damping chamber and a reservoir; a through shaft coupled to a piston, wherein said piston divides said chamber into a first chamber and a second chamber; a high-pressure line fluidly coupled with said chamber and said reservoir, to allow fluid flow from said first chamber and said second chamber to said reservoir, wherein said fluid flow through said high pressure line from said first chamber and said second chamber to said reservoir is automatically controlled; and a low-pressure line fluidly coupled with said chamber and said reservoir, to allow fluid flow from said reservoir to said first chamber and said second chamber, wherein said high-pressure line and said low-pressure line assist in self-centering said sway bar, wherein said fluid flow through said low pressure line from said reservoir to said first chamber and said second chamber is automatically controlled.

2. The sway bar system of claim 1, wherein said fluid flow from said first chamber and said second chamber to said reservoir is automatically controlled based upon operational information pertaining to said vehicle.

3. The sway bar system of claim 1, wherein said fluid flow from said first chamber and said second chamber to said reservoir is automatically controlled based upon operational information pertaining to a suspension component comprised, at least partially, of said body, said damping chamber, said piston, said through shaft and said reservoir.

4. The sway bar system of claim 1, wherein said fluid flow from said first chamber and said second chamber to said reservoir is automatically controlled based upon received user input settings.

5. The sway bar system of claim 4, wherein said received user input settings are selected from the group consisting of: a user-selected comfort setting, a user-selected sport setting, soft setting, medium setting, firm setting, hard setting, and locked out setting.

6. The sway bar system of claim 1, wherein said fluid flow from said reservoir to said first chamber and said second chamber is automatically controlled based upon operational information pertaining to said vehicle.

7. The sway bar system of claim 1, wherein said fluid flow from said reservoir to said first chamber and said second chamber is automatically controlled based upon operational information pertaining to a suspension component comprised, at least partially, of said body, said damping chamber, said piston, said through shaft and said reservoir.

8. The sway bar system of claim 1, wherein said fluid flow from said reservoir to said first chamber and said second chamber is automatically controlled based upon received user input settings.

9. The sway bar system of claim 8, wherein said received user input settings are selected from the group consisting of: a user-selected comfort setting, a user-selected sport setting, soft setting, medium setting, firm setting, hard setting, and locked out setting.

10. The sway bar system of claim 1 further comprising:

a base valve to automatically control the fluid flow between said high-pressure line and said low-pressure line, wherein said base valve automatically controls the flow between said damping chamber and said reservoir and as such provides the ability to automatically provide a rigid sway bar connection or a loose sway bar connection.

11. The sway bar system of claim 10, wherein said base valve automatically controls said fluid flow between said high-pressure line and said low-pressure line, and automatically controls said flow between said damping chamber and said reservoir based upon operational information pertaining to said vehicle.

12. The sway bar system of claim 1, wherein said base valve automatically controls said fluid flow between said high-pressure line and said low-pressure line, and automatically controls said flow between said damping chamber and said reservoir based upon operational information pertaining to a suspension component comprised, at least partially, of said body, said damping chamber, said piston, said through shaft and said reservoir.

13. The sway bar system of claim 1, wherein said base valve automatically controls said fluid flow between said high-pressure line and said low-pressure line, and automatically controls said flow between said damping chamber and said reservoir based upon received user input settings.

14. The sway bar system of claim 13, wherein said received user input settings are selected from the group consisting of: a user-selected comfort setting, a user-selected sport setting, soft setting, medium setting, firm setting, hard setting, and locked out setting.

15. The sway bar system of claim 10 wherein, said base valve is selected from a group consisting of a modal valve, a semi active valve, an active valve, an IQS valve, and a two-stage valve.

16. The sway bar system of claim 10 wherein, said base valve has a locked out position, wherein when said base valve is in said locked out position, said piston is caused to automatically return to an equilibrium position such that said sway bar is automatically maintained in a consistent position.

17. A sway bar system comprising:

a first damping link that couples a first end of a sway bar to a first location on a vehicle, wherein said first damping link is capable of self-centering said sway bar;

a second damping link that couples a second end of a sway bar to a second location on a vehicle, wherein said second damping link is capable of self-centering said sway bar, wherein said first damping link and said second damping link comprises:

a body comprising a damping chamber and a reservoir;

a through shaft coupled to a piston, wherein said piston divides said chamber into a first chamber and a second chamber;

a high-pressure line fluidly coupled with said chamber and said reservoir, to allow fluid flow from said first chamber and said second chamber to said reservoir;

a low-pressure line fluidly coupled with said chamber and said reservoir, to allow fluid flow from said reservoir to said first chamber and said second chamber, wherein said high-pressure line and said low-pressure line assist in self-centering said sway bar; and a base valve to automatically control the flow between said high-pressure line and said low-pressure line, wherein said base valve automatically controls the flow between said damping chamber and said reservoir and as such provides the ability to automatically provide a rigid sway bar connection or a loose sway bar connection.

18. The sway bar system of claim 17, wherein said base valve automatically controls said fluid flow between said high-pressure line and said low-pressure line, and automatically controls said flow between said damping chamber and said reservoir based upon operational information pertaining to said vehicle.

19. The sway bar system of claim 17, wherein said base valve automatically controls said fluid flow between said high-pressure line and said low-pressure line, and automatically controls said flow between said damping chamber and said reservoir based upon operational information pertaining to a suspension component comprised, at least partially, of said body, said damping chamber, said piston, said through shaft and said reservoir.

20. The sway bar system of claim 17, wherein said base valve automatically controls said fluid flow between said high-pressure line and said low-pressure line, and automatically controls said flow between said damping chamber and said reservoir based upon received user input settings.

21. The sway bar system of claim 20, wherein said received user input settings are selected from the group consisting of: a user-selected comfort setting, a user-selected sport setting, soft setting, medium setting, firm setting, hard setting, and locked out setting.

22. The sway bar system of claim 17 wherein, said base valve has a locked out position, wherein when said base valve is in said locked out position, said piston is caused to automatically return to an equilibrium position such that said sway bar is automatically maintained in a consistent position.

23. A vehicle sway bar system comprising:

at least one damping link that couples a sway bar to a location on a vehicle, wherein said at least one damping link is capable of self-centering said sway bar, wherein said at least one damping link comprises:

a body comprising a damping chamber and a reservoir;

a through shaft coupled to a piston, wherein said piston divides said chamber into a first chamber and a second chamber;

a high-pressure line fluidly coupled with said chamber and said reservoir, to allow fluid flow from said first chamber and said second chamber to said reservoir;

a low-pressure line fluidly coupled with said chamber and said reservoir, to allow fluid flow from said reservoir to said first chamber and said second chamber, wherein said high-pressure line and said low-pressure line assist in self-centering said sway bar; and a base valve to automatically control the flow between said high-pressure line and said low-pressure line, wherein said base valve automatically controls the flow between said damping chamber and said reservoir and as such provides the ability to provide a rigid sway bar connection or a loose sway bar connection.

24. The sway bar system of claim 23, wherein said base valve automatically controls said fluid flow between said high-pressure line and said low-pressure line, and automatically controls said flow between said damping chamber and said reservoir based upon operational information pertaining to said vehicle.

25. The sway bar system of claim 23, wherein said base valve automatically controls said fluid flow between said high-pressure line and said low-pressure line, and automatically controls said flow between said damping chamber and said reservoir based upon operational information pertaining to a suspension component comprised, at least partially, of said body, said damping chamber, said piston, said through shaft and said reservoir.

26. The sway bar system of claim 23, wherein said base valve automatically controls said fluid flow between said high-pressure line and said low-pressure line, and automatically controls said flow between said damping chamber and said reservoir based upon received user input settings.

27. The sway bar system of claim 26, wherein said received user input settings are selected from the group consisting of: a user-selected comfort setting, a user-selected sport setting, soft setting, medium setting, firm setting, hard setting, and locked out setting.

28. The sway bar system of claim 23 wherein, said base valve has a locked out position, wherein when said base valve is in said locked out position, said piston is caused to automatically return to an equilibrium position such that said sway bar is automatically maintained in a consistent position.

* * * * *